(12) United States Patent
Stelman et al.

(10) Patent No.: US 11,691,470 B2
(45) Date of Patent: Jul. 4, 2023

(54) SYSTEM AND METHOD FOR AN AUTONOMOUS ROBOT DRIVETRAIN WITH AN ACTUATED BOGIE

(71) Applicant: CARTKEN, INC., Oakland, CA (US)

(72) Inventors: Jake Stelman, Oakland, CA (US); Marc Thomas, Oakland, CA (US); Jonas Witt, Oakland, CA (US); Christian Bersch, Oakland, CA (US); Jason Hardy, Oakland, CA (US)

(73) Assignee: Cartken Inc., Oakland, CA (US)

( * ) Notice: Subject to any disclaimer, the term of this patent is extended or adjusted under 35 U.S.C. 154(b) by 37 days.

(21) Appl. No.: 17/218,431

(22) Filed: Mar. 31, 2021

(65) Prior Publication Data

US 2021/0309060 A1    Oct. 7, 2021

Related U.S. Application Data

(60) Provisional application No. 63/003,712, filed on Apr. 1, 2020.

(51) Int. Cl.
*B60G 1/00* (2006.01)
*B62D 63/04* (2006.01)

(52) U.S. Cl.
CPC ............ *B60G 1/00* (2013.01); *B62D 63/04* (2013.01); *B60G 2200/32* (2013.01); *B60G 2200/446* (2013.01); *B60G 2204/45* (2013.01); *B60G 2204/4604* (2013.01); *B60G 2300/26* (2013.01)

(58) Field of Classification Search
CPC .. B60G 1/00; B60G 2200/32; B60G 2204/45; B60G 2204/4502; B62D 63/04
See application file for complete search history.

(56) References Cited

U.S. PATENT DOCUMENTS

| 5,655,615 | A | * | 8/1997 | Mick | B62D 49/0607 |
|---|---|---|---|---|---|
| | | | | | 280/5.2 |
| 2002/0163165 | A1 | * | 11/2002 | Adema | B60G 5/02 |
| | | | | | 280/682 |
| 2016/0089942 | A1 | * | 3/2016 | Noble | B60G 11/22 |
| | | | | | 280/677 |
| 2017/0158011 | A1 | * | 6/2017 | Rarey | B60G 11/22 |
| 2021/0300138 | A1 | * | 9/2021 | Lacher | B60G 17/019 |

FOREIGN PATENT DOCUMENTS

DE      102016004721 A1 *  2/2017

* cited by examiner

*Primary Examiner* — Paul N Dickson
*Assistant Examiner* — Matthew D Lee

(57) ABSTRACT

The present invention relates to a novel robot drive train that is robust, and low cost. The drive train is capable of ascending obstacles greater than the height of its wheels, protects the robot against shocks/vibration, and is highly maneuverable, such as able to execute a zero-point turn. To control the bogie in a variety of scenarios, a novel mechanism is used to selectively limit the articulation range of the bogie and/or programmatically apply a preload to the bogie axle.

20 Claims, 30 Drawing Sheets

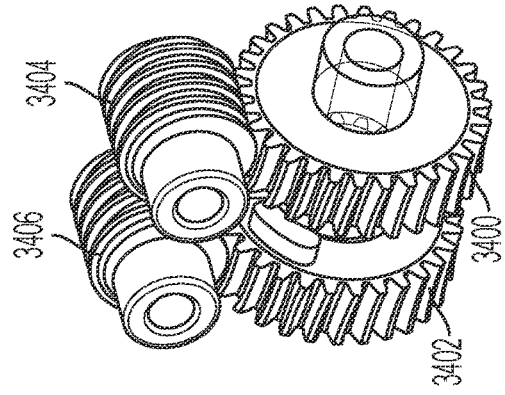
FIG. 34
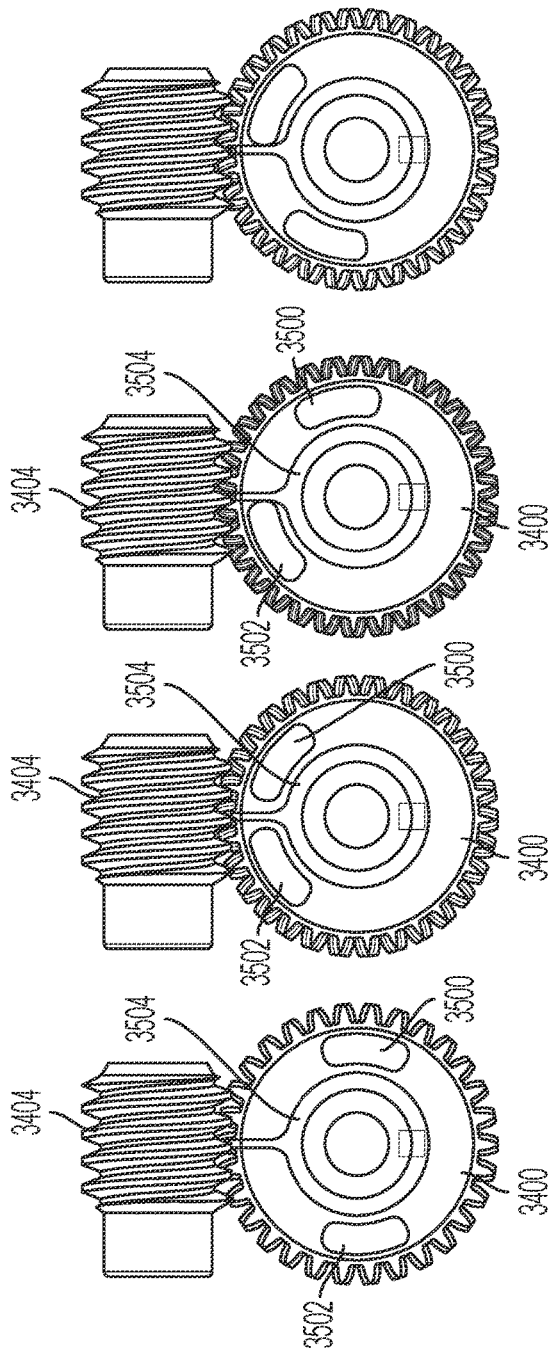
FIG. 35D
FIG. 35C
FIG. 35B
FIG. 35A

SYSTEM AND METHOD FOR AN AUTONOMOUS ROBOT DRIVETRAIN WITH AN ACTUATED BOGIE

RELATED APPLICATIONS

This application claims the benefit of U.S. Provisional Patent Application No. 63/003,712 entitled "NOVEL LOW-COST, ROBOT SUSPENSION VIA PROGRAMMATICALLY ACTUATED BOGIE AND TRAILING ARM SUSPENSION" filed on Apr. 1, 2020 and which is commonly owned, the disclosure of which is incorporated herein by reference in its entirety.

BACKGROUND OF THE INVENTION

The physical delivery of products to recipients, such as consumers, has improved dramatically over the years in terms of speed, efficiency, and convenience. Many merchants are able to offer same day and next day delivery for products which traditionally took days or weeks to deliver. In a product's journey from a warehouse shelf, to the back of a truck, to a customer doorstep, the "last mile" of delivery is typically the final stage of the journey; this is the point at which the product ultimately arrives to the recipient. The goal of last mile delivery is to transport an item to its recipient in the quickest and most efficient way possible. With the continuously evolving market and demand for convenient customer experience across industries such as e-commerce, food, and retail, to name a few, the requirements for delivery speed and efficiency are constantly being tested.

Last mile delivery has traditionally been accomplished using a human controlled truck, delivery van, bicycle, cart, etc. For example, a recipient may order a product for delivery to their home or business. The product may be picked from a materials handling facility, packed and shipped to the customer for final delivery by a shipping carrier. The shipping carrier will load the product onto a truck to the final delivery location and a human driver typically will retrieve the product from the truck and complete the delivery to the recipient, such as by leaving the product at a doorstep or mailbox.

A promising alternative to human delivery are ground-based delivery robots. Such robots can be relatively small, travel on sidewalks or other pedestrian walkways, and drive autonomously and/or semi-autonomously. Using computer vision systems based on several redundant sensors and sophisticated analysis algorithms, these delivery robots can navigate to their delivery destination with accuracy, making delivery robots perfect candidates for autonomous last-mile delivery. Such robots can be virtually silent, use little energy, be relatively inexpensive to produce, and deliver items at any time convenient for the recipient.

The use of delivery robots poses unique challenges, since the contents being transported need to be delivered without damage. Last mile delivery robots often travel on multimodal paths, such as roadways, sidewalks, driveways, and the like, any of which may be paved, partially paved, or unpaved, and which may include various obstacles, curbs, steps, and other "bumps" along the way.

What is needed is a highly maneuverable delivery robot drivetrain that allows the robot to ascend and descend obstacles, and easily turn under a variety of environmental conditions, while affording protection to the robot and its contents against shocks and vibrations. As such, the present invention provides a novel mechanism to selectively control actuation of a bogie, as well as to programmatically apply loads to a bogie axle.

SUMMARY OF THE INVENTION

In an embodiment, the present invention provides a system to actuate wheels on a vehicle, comprising: a bogie having a first end and a second end, the bogie rotatable about a central location between the first end and the second end; a first wheel mounted to the first end of the bogie; a second wheel mounted to the second end of the bogie; a first linear actuator coupled to a first endstop, the first endstop configured to apply pressure to the bogie at a first location when deployed by the first linear actuator; and a second linear actuator coupled to a second endstop, the second endstop configured to apply pressure to the bogie at a second location when deployed by the second linear actuator, wherein the first endstop and the second endstop are independently and selectively deployed, wherein the first end is prevented from moving in an upward direction when the first endstop is deployed, and wherein the second end is prevented from moving in an upward direction when the second endstop is deployed.

In another embodiment, the present invention provides a system to actuate wheels on a vehicle, comprising: a bogie having a first end and a second end, the bogie rotatable about a central location between the first end and the second end; a first wheel mounted to the first end of the bogie; a second wheel mounted to the second end of the bogie; a first linear actuator coupled to a first endstop, the first endstop configured to apply pressure to the bogie at a first location when deployed by the first linear actuator; and a second linear actuator coupled to a second endstop, the second endstop configured to apply pressure to the bogie at a second location when deployed by the second linear actuator, wherein the first linear actuator is configured to partially retract the first endstop and fully retract the first endstop, and wherein the second linear actuator is configured to partially retract the second endstop and fully retract the second endstop.

In yet another embodiment, the present invention provides a system to actuate wheels on a vehicle, comprising: a bogie having a first end and a second end, the bogie rotatable about a central location between the first end and the second end; a first wheel mounted to the first end of the bogie; a second wheel mounted to the second end of the bogie; a first linear actuator coupled to a first endstop, the first endstop configured to apply pressure to the bogie at a first location when deployed by the first linear actuator; and a second linear actuator coupled to a second endstop, the second endstop configured to apply pressure to the bogie at a second location when deployed by the second linear actuator, wherein the first linear actuator and second linear actuator are configured to independently operate.

BRIEF DESCRIPTION OF THE DRAWING FIGURES

The accompanying drawing figures incorporated in and forming a part of this specification illustrate several aspects of the disclosure, and together with the description serve to explain the principles of the present invention.

FIG. 34 is a perspective view of a dual independent worm gear actuator system, according to an embodiment of the present invention;

FIG. 35A is a diagram depicting a passive state of the dual independent worm gear actuator system which provides for a large range of articulation for a bogie, according to an embodiment of the present invention;

FIG. 35B is a diagram depicting a passive state of the dual independent worm gear actuator system which provides for a limited articulation range for the bogie, according to an embodiment of the present invention;

FIG. 35C is a diagram depicting an active state of the dual independent worm gear actuator system where pressure is applied to the middle primary wheel, according to an embodiment of the present invention;

FIG. 35D is a diagram depicting an active state of the dual independent worm gear actuator system where pressure is applied to the front primary wheel, according to an embodiment of the present invention;

DETAILED DESCRIPTION

The description set forth below in connection with the appended drawings is intended as a description of presently preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

Figure 1:
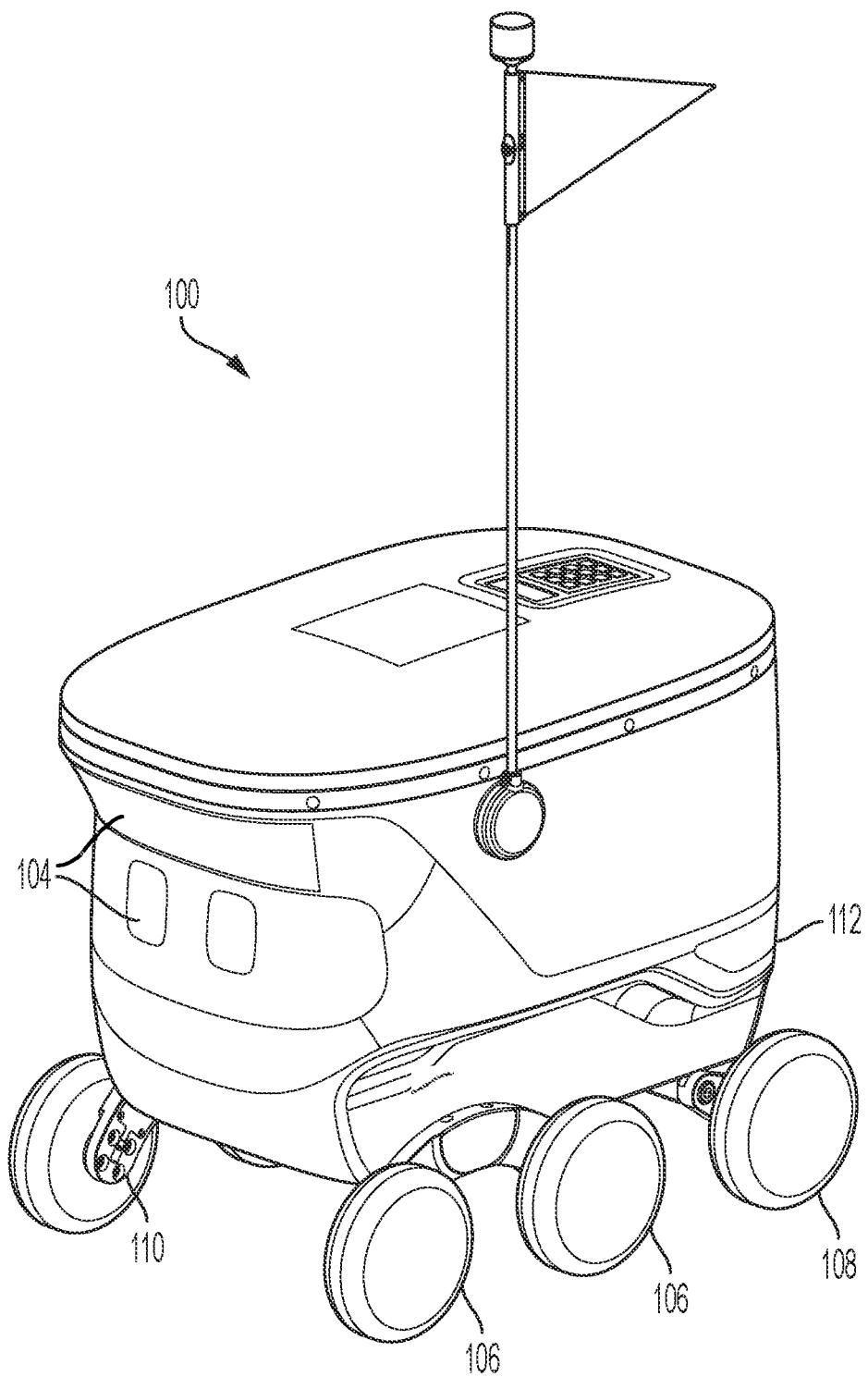
FIG. 1 is an exemplary depiction of a robot, according to an embodiment of the present invention.

FIG. 1 is a depiction of an exemplary robot 100, according to an embodiment of the present invention. The robot 100 can include a container 102 that includes various sensors 104. The container 102 is mounted on a drivetrain which consists of two opposing pairs of primary wheels 106, as well as a pair of rear wheels 108 coupled to the container 102 via a trailing-link suspension, which is described in more detail herein. In an embodiment, each pair of primary wheels 106 is mounted on a respective bogie 110. Each bogie 110 can be adjusted via linear actuators 112 mounted adjacent to each bogie 110.

In an embodiment, the container 102 includes a hollow cavity and includes a closable opening that allows items to be placed within the hollow cavity. The closable mechanism can be a hinged lid, a retractable panel, such as a roof or sidewall, or any other mechanism which allows items to be placed within the cavity and securely stored for transport.

The container 102 can be a rigid plastic container. In another embodiment, the container 102 can be made from metal, such as a lightweight aluminum or alloy, or the container 102 can be made from a combination of both polymeric and metallic components.

The container 102 can be suitable for transporting perishable and non-perishable items. In an embodiment, in order to facilitate the transport of perishable items, the container 102 can include insulation or thermally protective properties to ensure that a proper temperature or climate is maintained within the container 102.

In an embodiment, the container 102 can include a removable bin or basket (not pictured) that can be placed within the cavity. The bin, for example, be used to store items before loading them into the container 102. The bin can further provide a barrier between the items being transported and the cavity of the container 102. For example, if liquids or spillable food items are being transported, the bin can act to prevent spillage from permeating into the cavity and possibly affecting the electronics or sensors 104 within the container 102.

In an embodiment, the container 102 can be permanently affixed to the robot 100, so that the container 102 cannot be removed or detached from the robot 100. In another embodiment, the container 102 can be detachably secured to the robot 100, so that different containers can be interchangeably mounted to the robot 100, and the container 102 can be removed for servicing, cleaning, repairing, and the like without the robot 100 and its corresponding drivetrain. Conversely, in this embodiment, the container 102 can be removed so that the robot 100, and its corresponding drivetrain can be accessed for servicing, cleaning, repairing, and the like.

In an embodiment, the container 102 contains sensors 104 which are integrated within, or coupled to, the container 102, as shown in FIG. 1. The sensors 104 can include a plurality of sensors that allow the robot 100 to detect obstacles, environmental conditions, potential theft, as well as to assist with navigation. In an embodiment, the sensors 104 can include, but are not limited to, imaging devices such as cameras, infrared sensors, LIDAR, laser, radar, ultrasound, surface wave sensors and the like; ambient sensors such as temperature sensors, humidity sensors, moisture sensors, and the like; movement sensors such as accelerometers, gyroscopes, position sensors, and various other inertial measurement unit sensors; and contact sensors such as force sensing resistors, strain gauges, transducers, and the like.

In another embodiment, the sensors 104 can be removably secured to the robot 100, so that different sensors can be interchangeably mounted to the robot 100 depending on a desired context, route, or application of the robot 100.

In an embodiment, the robot 100 can further include an on-board computer configured with software for navigation and obstacle avoidance, as well as a wireless communication module to enable sending and receiving information to and from a remote site, such as a central dispatch center.

Figure 2:
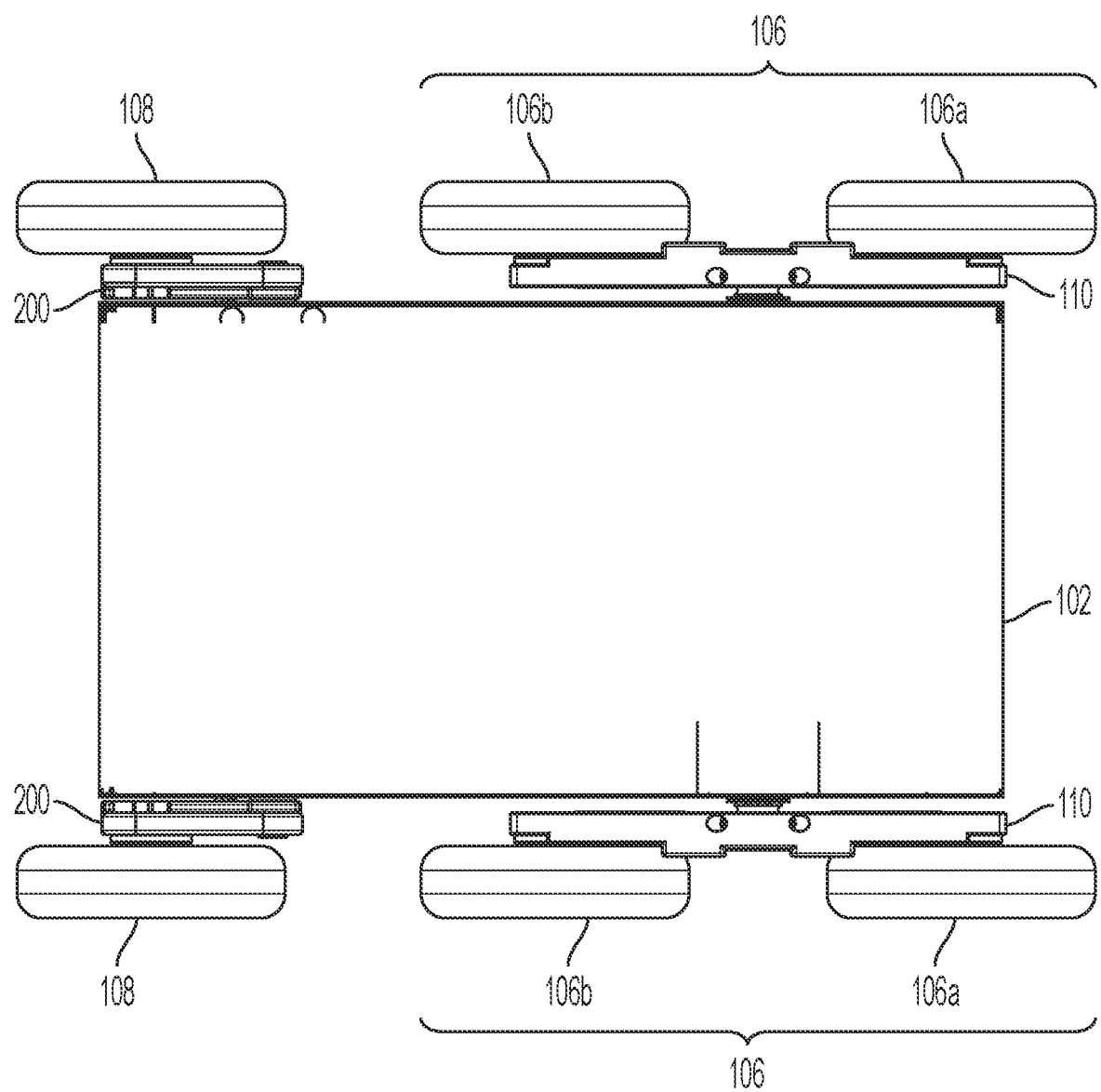
FIG. 2 is a perspective view of a bottom of the robot, according to an embodiment of the present invention.

FIG. 2 is a perspective view of a bottom of the robot 100, according to an embodiment of the present invention. In a preferred embodiment, the robot 100 includes six wheels, comprising front primary wheels 106a and middle primary wheels 106b, and a pair of rear wheels 108. In an embodiment, each pair of front wheels 106 is mounted on a respective opposing bogie 110. Each rear wheel 108 is mounted to the container 102 via a respective trailing-link suspension 200.

In an embodiment, each of the wheels 106, 108 can include in-hub motors with encoders such that each of the wheels 106, 108 can be individually controlled and monitored. By individually adjusting the velocity of each of the wheels 106, 108, the robot 100 is capable of "skid steering" where a differential velocity is created between various wheels, such as between opposing primary wheels 106, in order to induce yaw.

In another embodiments, the robot 100 is capable of a two wheel drive, four wheel drive, as well as drives using holonomic, omni-directional or mecanum wheel-based multi-directional mobility.

While FIG. 2 depicts an embodiment of the robot 100 having six wheels, the present invention may include any number of wheels that provides stable movement of the robot 100. For example, the robot 100 can have two wheels, three wheels consisting of a front pair and a rear trailing-link wheel, and the various other combinations thereof. In a preferred embodiment, the robot 100 can have anywhere from two wheels to eight wheels.

Figure 3:
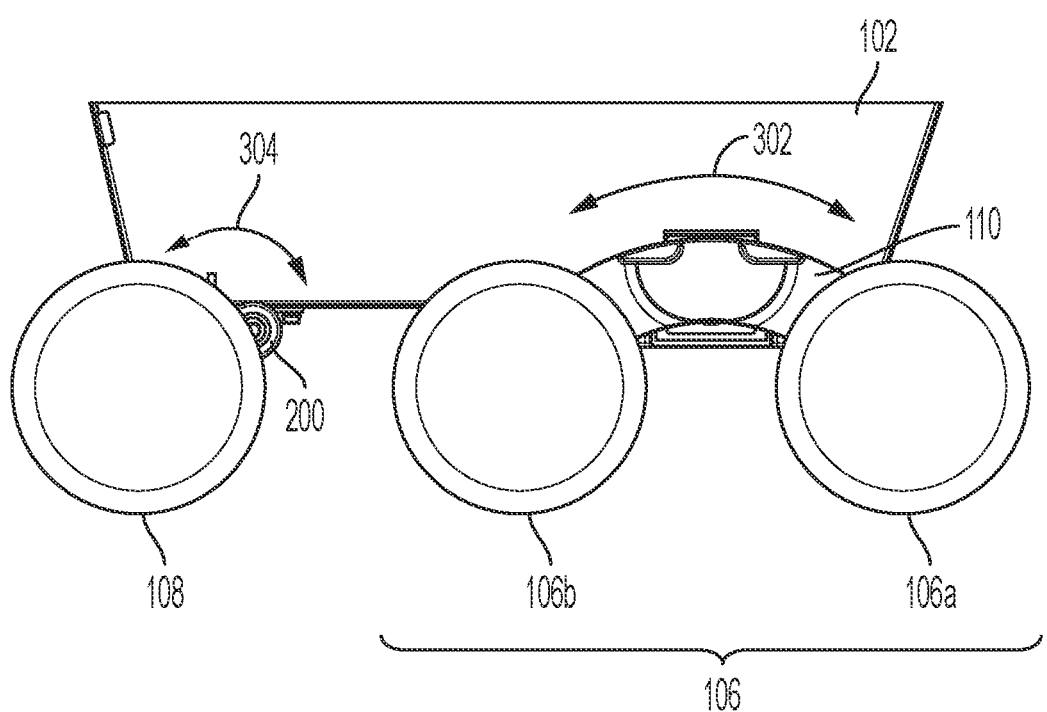
FIG. 3 is a lateral side view of the robot, according to an embodiment of the present invention.

FIG. 3 is a lateral side view of the robot 100, according to an embodiment of the present invention. In an embodiment, the primary wheels 106 are mounted on the bogie 110, and the bogie 110 is mounted to the drivetrain. The primary wheels 106 consist of a front primary wheel 106a and middle primary wheel 106b. The bogie 110 is capable of articulation along an axis perpendicular to the length of the container 102. Arrows 302 indicate the articulation directions of the bogie 110 with respect to a horizontal plane of container 102. Articulation of the bogie 110 allows pressure to be selectively applied or removed from the front primary wheel 106a and middle primary wheel 106b, as well as the front primary wheel 106a and middle primary wheel 106b to be selectively raised and lowered. In an embodiment, the trailing-link suspension 108 is capable of articulation in the directions indicated by arrows 304.

Figure 4A:
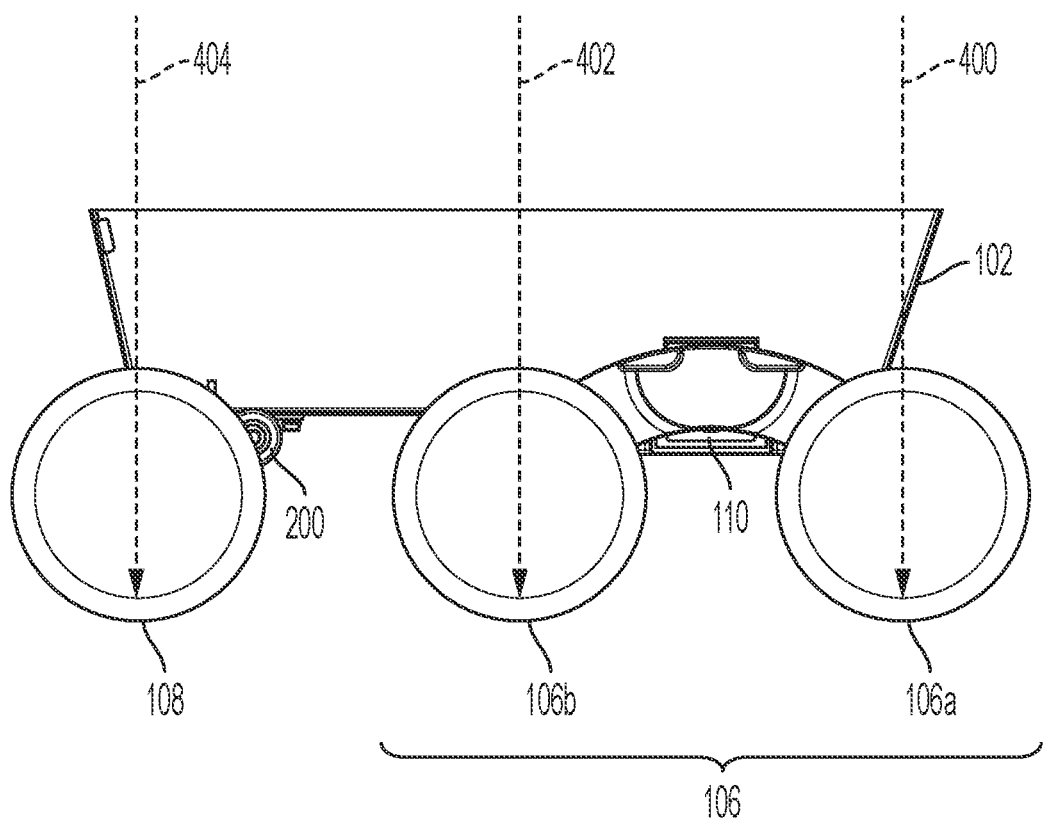
FIG. 4A is a diagram depicting a passive state of the bogie, according to an embodiment of the present invention.

FIG. 4A is a diagram depicting a passive state of the bogie 110, according to an embodiment of the present invention. In the passive state, the bogie 110 is not articulated with respect to the container 102, thereby maintaining a passive force 400 to the front primary wheel 106a and similar or equal passive force 402 to the middle primary wheel 402. Further, in the passive state, the trailing-link suspension 108 applies a similar or equal passive force 404 to the rear wheel 108. Thus, in the passive state, the robot 100 passively restricts articulation of the bogie 110 so that there is no counter-rotation for one wheel over the other.

Figure 4B:
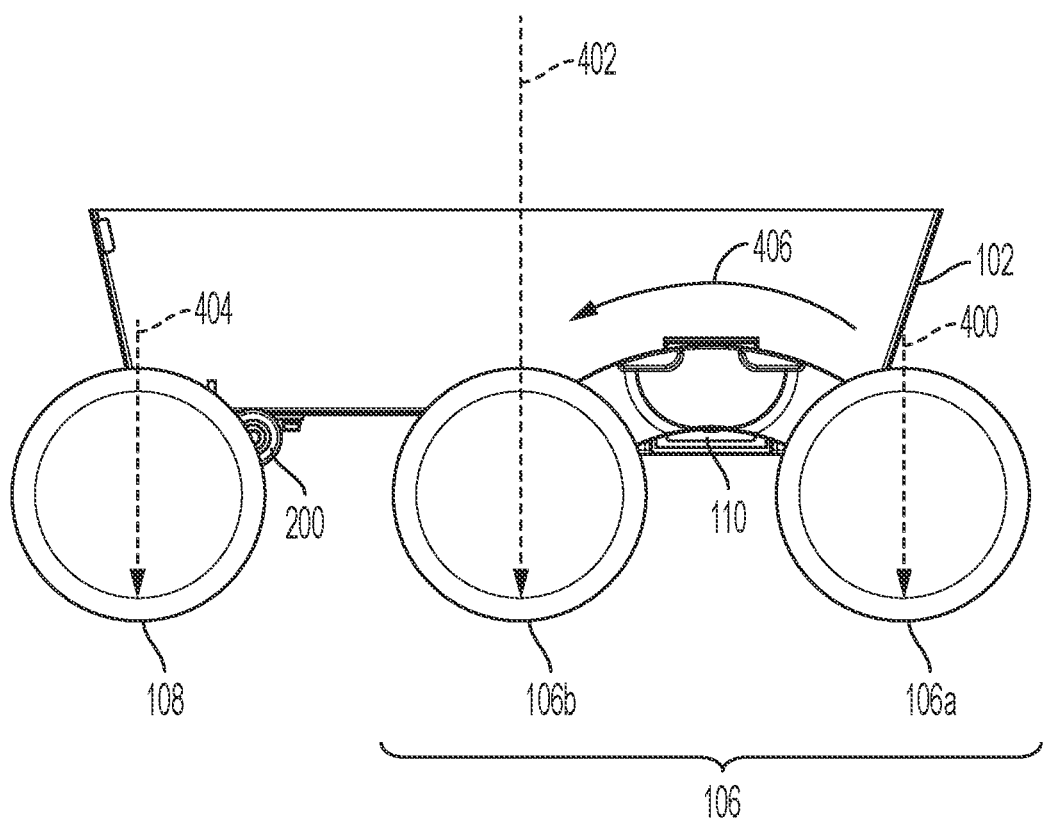
FIG. 4B is a diagram depicting an active actuation state of the bogie, according to an embodiment of the present invention.

FIG. 4B is a diagram depicting active actuation state of the bogie 110, according to an embodiment of the present invention. In the active actuation state, the bogie 110 is articulated in the direction of arrow 406. Upon articulation, the bogie 110 reduces the force 400 applied to the front primary wheel 106a, and increases the force applied to the middle primary wheel 106b. Thus, by actively pushing the middle primary wheel 106b downward (i.e., applying more pressure or weight to the middle primary wheel 106b), the robot 100 is able to turn smoothly with utilizing less power. In addition, by reducing the force 400 applied to the front primary wheel 106a, as well as the force 404 applied to the rear wheel 108, this results in lessened wheel wear over time. The active actuation state is especially useful on high-traction surfaces, such as carpets, grass, asphalt, and the like.

Figure 5:
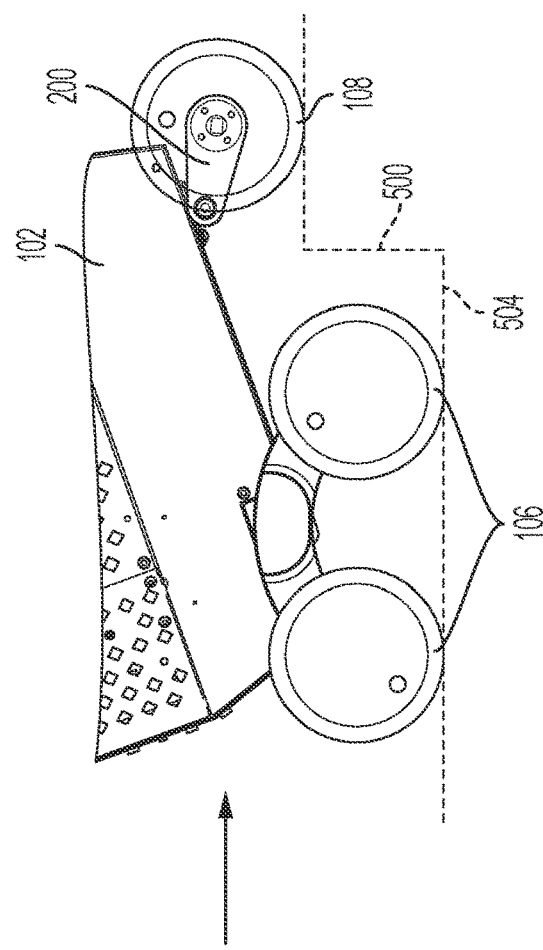
FIG. 5 is a diagram depicting a rear suspension function of the robot, according to an embodiment of the present invention.
Figure 5:
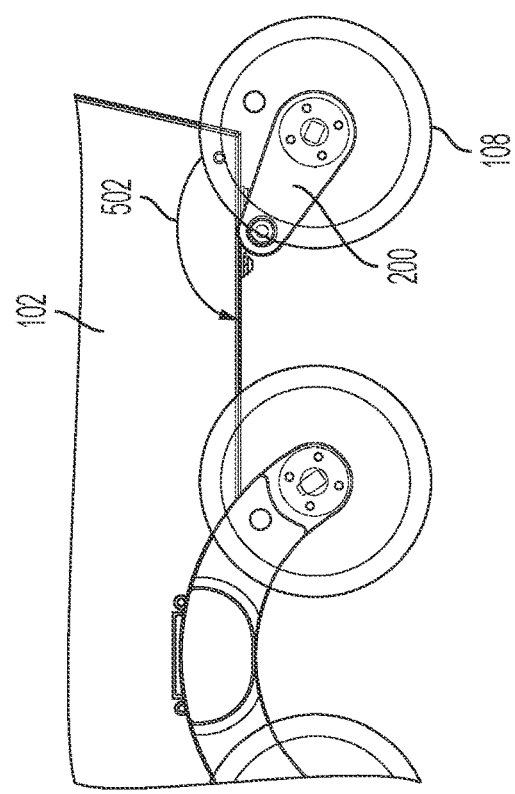

FIG. 5 is a diagram depicting a rear suspension function of the robot 100, according to an embodiment of the present invention. The trailing-link suspension 200 can assist the robot 100 with traveling over obstacles, such as a curb 500. In order to navigate the curb 500, the trailing-link suspension 200 is articulated in a direction indicated by arrow 502, thereby raising the rear wheel 108 relative to the container 102. The trailing-link suspension 200 can thus protect the robot 100 and its contents from sudden impact, such as when the robot 102 navigates off of the curb 500 and onto the ground 504. As the rear wheel 108 travels off of the curb 500, the trailing-link suspension 200 can articulate in a direction opposite to arrow 502, thereby lowering the rear wheel 108 as descends from the curb 500 and approaches the ground 504, providing for a lessened impact on the ground 504.

Figure 6:
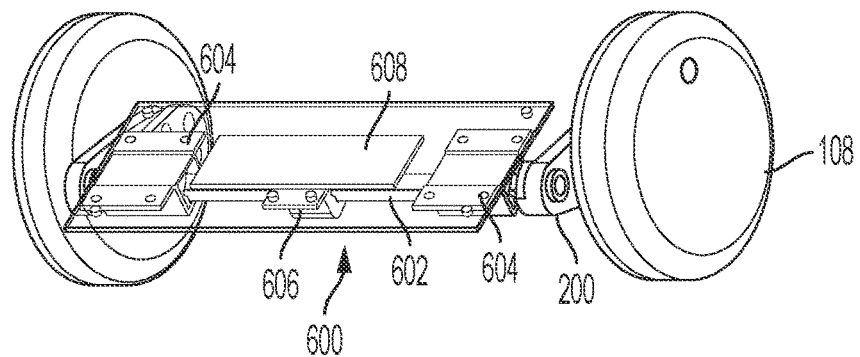
FIG. 6 is an exemplary depiction of a rear suspension module, according to an embodiment of the present invention.

FIG. 6 is an exemplary depiction of a rear suspension module 600, according to an embodiment of the present invention. The rear suspension module 600 contains the rear wheels 108, trailing-link suspensions 200, as well as an axle 602 coupled to both rear wheels 108 and trailing-link suspensions 200. The axle 602 includes outer mounts 604 and an inner mount 606 which is used to secure a motor controller board 608.

In another embodiment, each rear wheel 108 can be connected to a dedicated, independent axle, and not a single axle 602 as shown in FIG. 6.

Figure 7:
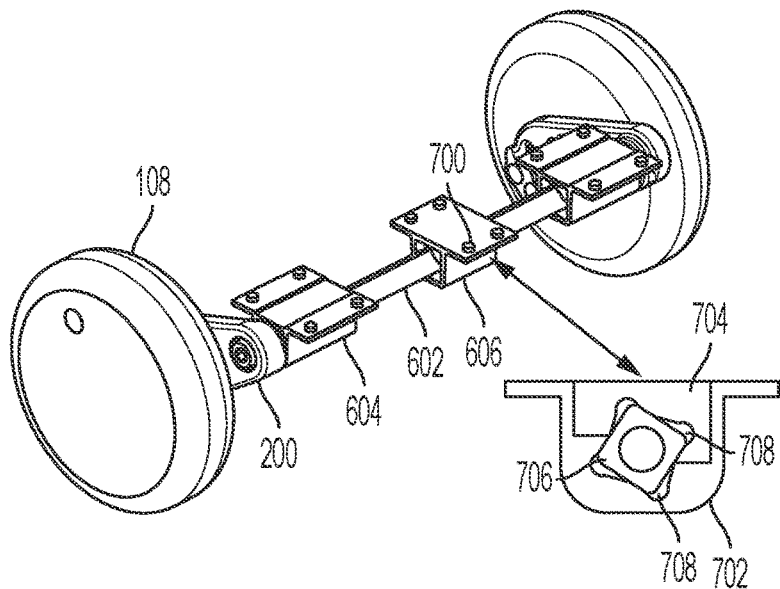
FIG. 7 is a perspective view of the rear suspension module and an enlarged view of an endstop block, according to an embodiment of the present invention.

FIG. 7 is a perspective view of the rear suspension module 600 and an enlarged view of an endstop block 700, according to an embodiment of the present invention. Each of the outer mounts 604 and the inner mount 606 can include endstop blocks 700 which serve to limit the range of the rear suspension module 600, and which protect the rear suspension module 600 from damage under high loads, as well as damage from shock and vibrations due to impacts.

In an embodiment, the endstop block 700 includes a housing 702 and a cap 704. The cap 704 fits within the housing 702 to form an enclosure, as shown in FIG. 7. An endstop 706 is disposed within the enclosure formed by the housing 702 and cap 704. The enclosure formed by the housing 702 and cap 704 can include multiple indentations 708 which allows the enclosure and/or the endstop 706 to flex and deform under stress. The role of the endstop 706 is to limit the rotational motion of block 806, described herein with reference to FIG. 8, to a prescribed maximum value in both a forward and backward direction.

The housing 702, cap 704, and/or endstop 706 can be each be rigid or semi-rigid, and made from a metallic, composite, or polymeric material. Such metallic material can include, but are not limited to, steel, aluminum, carbon steel, alloy steel, stainless steel, iron, magnesium, copper, brass, bronze, zinc, and various composites and alloys thereof.

Such polymeric materials can include, but are not limited to, acrylic resin, polycarbonate resin, polyethylene terephthalate resin, a thermo-setting or photo-setting polymer such as epoxy resin, rubber such as synthetic rubber, polybutadiene rubber and nitrile rubber, or a polymeric elastomer such as styrene butadiene elastomer and styrene isoprene elastomer, and combinations thereof. In an embodiment, the housing 702, cap 704, and endstop 706 can be formed from different materials, as well as from materials having different properties (i.e., ductility, hardness, resistance to deformation, etc.).

Figure 8:
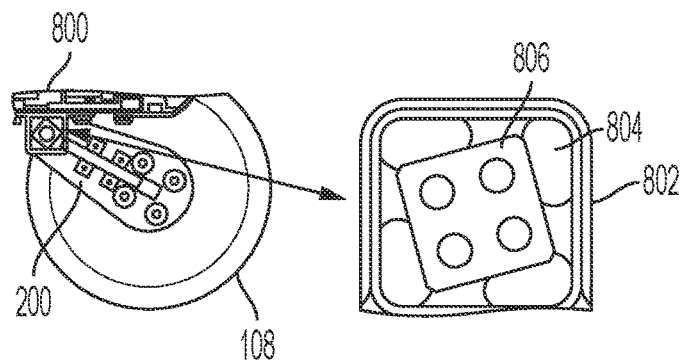
FIG. 8 is a perspective view of the rear suspension module and an enlarged view of a shock absorber, according to an embodiment of the present invention.

FIG. 8 is a perspective view of the rear suspension module 600 and an enlarged view of a shock absorber 800, according to an embodiment of the present invention. In an embodiment, each trailing-link suspension 200 includes a shock absorber 800 mounted co-axially with the axle 602. The shock absorber 800 includes a housing 802, dampers 804, and a block 806 located between the dampers 804, as shown in FIG. 8. As the trailing-link suspension 200 articulates about the axle 602, the shock absorber 800 absorbs the load applied at the articulation point. The shock absorber 800 can act as a spring, pre-tensioner, damper, and bearing. In an embodiment, the block 806 included threaded holes which are used to fasten and secure the shock absorber 800 to the trailing-link suspension 200, as well as to the axle 602.

The housing 802, dampers 804, and/or block 806 can be made from an elastomeric material, such as, but not limited to, acrylic resin, polycarbonate resin, polyethylene terephthalate resin, a thermo-setting or photo-setting polymer such as epoxy resin, rubber such as synthetic rubber, polybutadiene rubber and nitrile rubber, or a polymeric elastomer such as styrene butadiene elastomer and styrene isoprene elastomer, and combinations thereof. In an embodiment, the housing 802, dampers 804, and/or block 806 can be formed from different materials, as well as from elastomers having different properties.

Figure 9:
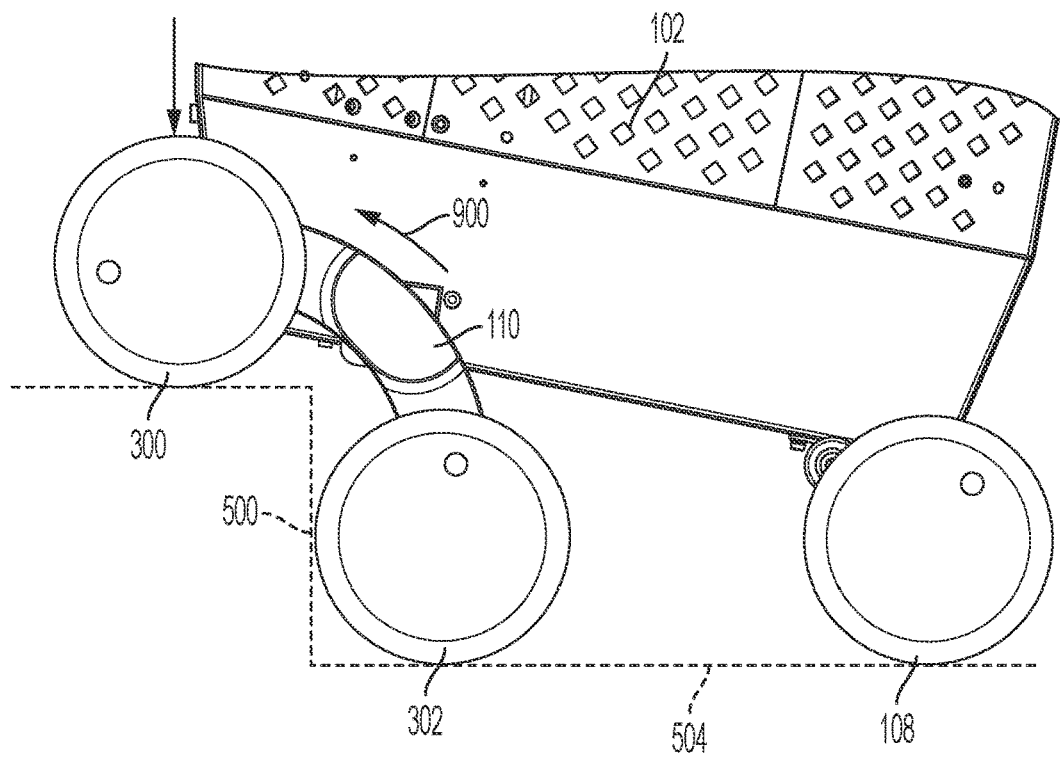
FIG. 9 is a diagram depicting the robot travelling up a curb, according to an embodiment of the present invention.

FIG. 9 is a diagram depicting the robot 100 travelling up a curb 500, according to an embodiment of the present invention. As the front primary wheel 106a negotiates the curb 500, the bogie 110 articulates in a direction indicated by arrow 900, and can actively push the front primary wheel 106a downward, thereby increasing the force applied to the front primary wheel 108. In another embodiment, the bogie 110 can remain in a passive mode when travelling up the curb 500, and naturally articulate based on the geometry of the curb 500. This allows the front primary wheel 106a to stabilize and facilitate the climbing of the middle primary wheel 106b up the curb 500.

Figure 10:
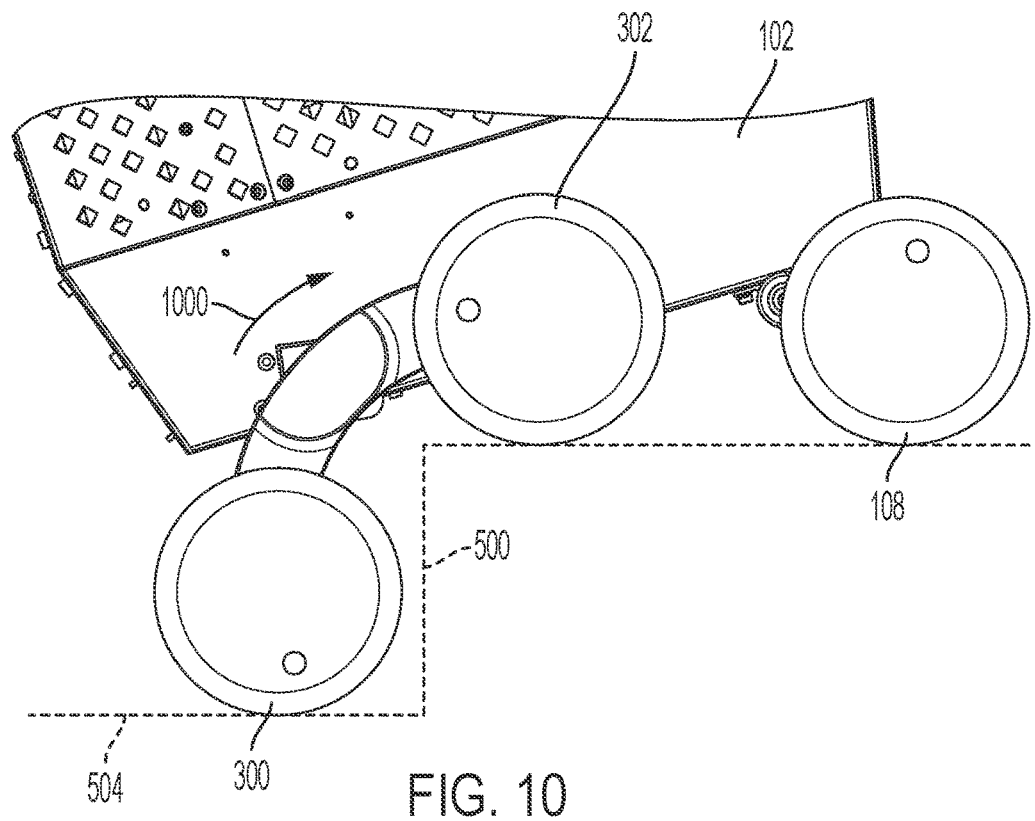
FIG. 10 is a diagram depicting the robot travelling down a curb, according to an embodiment of the present invention.

FIG. 10 is a diagram depicting the robot 100 travelling down a curb 500, according to an embodiment of the present invention. When the middle primary wheel 106b negotiates the curb 500, and the front primary wheel 106a has already descended the curb 500, the bogie 110 articulates in a direction indicated by arrow 1000, and actively pushes the middle primary wheel 106b downward to lower the middle primary wheel 106b as it descends from the curb 500 and approaches the ground 504, thereby providing for a lessened impact on the ground 504. In another embodiment, the bogie 110 can remain in a passive mode when travelling down the curb 500, and naturally articulate based on the geometry of the curb 500.

In an embodiment, the bogie 110 can be actuated based on a required driving mode for the robot 100. A first driving mode is passive actuation of the bogie 110 with a large articulation range. In this mode, the bogie 110 is permitted to articulate +/−45° in either direction, which is useful when the robot 100 needs to negotiate large obstacles such as climbing curbs. The articulation range disclosed for the first driving mode is for illustrative purposes only, and the bogie 110 could articulate +/−90° if required based on the obstacle size and dimensions, as well as the grade of the path being travelled by the robot 100.

A second driving mode is a passive actuation of the bogie 110 with limited articulation range. In this mode, the bogie 110 is permitted to articulate +/−5° in either direction, which is useful when the robot 100 needs to negotiate smaller obstacles or conform to small environmental variations, such as, for example, grade changes, sidewalk cracks, debris, rocks, and the like. The limited range of articulation in this mode increases the stability of the robot 100. For example, if the articulation range was not limited, the robot 100 could tip about the axle 602 rather than rotate about the front primary wheel 106a. The articulation range disclosed for the second driving mode is for illustrative purposes only, and the bogie 110 could articulate +/−30° if required based on the obstacle size and dimensions, as well as the grade of the path being travelled by the robot 100.

A third driving mode is active actuation of the middle primary wheel 106b. For small radius turns, such as on high-traction surfaces, the bogie 110 actively pushes the middle primary wheel 106b downward, putting increased pressure on the middle primary wheel 106b, thereby allowing the robot 100 to turn smoothly with utilizing less power. In addition, by reducing the force applied to the front primary wheel 106a during small radius turns, this results in lessened wheel wear over time.

A fourth driving mode is active actuation of the front primary wheel 106a. In some scenarios where the robot 100 is ascending an obstacle, such as a curb, the bogie 110 can actively push the front primary wheel 106a downward, thereby putting increased pressure on the front primary wheel 106a. This allows the front primary wheel 106a to stabilize and facilitate the climbing of the middle primary wheel 106b up the curb.

Figure 11:
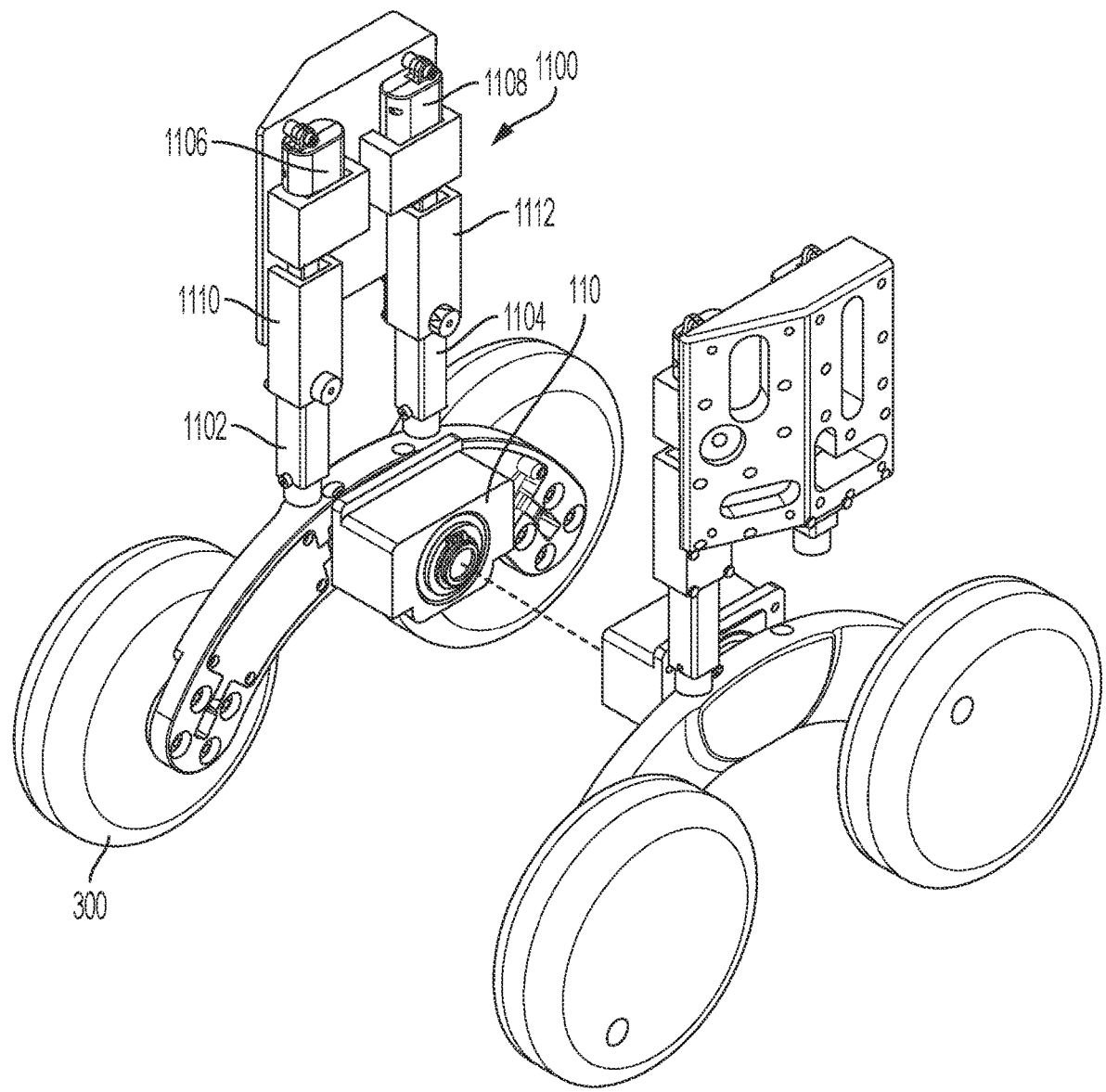
FIG. 11 is a perspective view of a linear exterior endstop system for a bogie, according to an embodiment of the present invention.

FIG. 11 is a perspective view of linear exterior endstops 1100 for bogies 110, according to an embodiment of the present invention. Conventional systems to actuate bogies have a number of inherent challenges. For example, some conventional systems have a motor directly attached to a bogie axle. However, active actuation on a middle wheel requires that axle torques are capable of at least partially lifting a robot under a variety of loading conditions. Furthermore, passive actuation of a bogie requires that the bogie is "back drivable" (i.e., the ease by which a motor can be driven by its attached load when power is removed). By being back drivable, a high ratio gearbox is prohibited from being attached to the motor, since it would impede the ease by which the axle could be back driven.

Thus, the high torque requirements of a bogie with a direct motor, plus the inability of such as system to be easily back drive, requires that the motor be relatively strong and have minimal gearing to provide a mechanical advantage. Such motors are typically large, and expensive in terms of cost as well as power consumption.

To overcome the aforementioned challenges of conventional systems, the present invention utilizes a linear exterior endstop system 1100 to control the articulation of the bogie 110, instead of a motor directly coupled to the bogie axle.

The linear exterior endstop system 1100 includes a front primary wheel endstop 1102 and middle primary wheel endstop 1104. Each endstop 1102, 1104 is coupled to an actuator 1106, 1108 which controls independent deployment and retraction of each endstop 1102, 1104. Furthermore, each endstop 1102, 1104 includes a respective housing 1110, 1112 into which each endstop 1102, 1104 can retract into. The linear exterior endstops 1100 provide a low-cost, small size, and highly-reliable alternative to having a motor directly coupled to the bogie axle.

Figure 12:
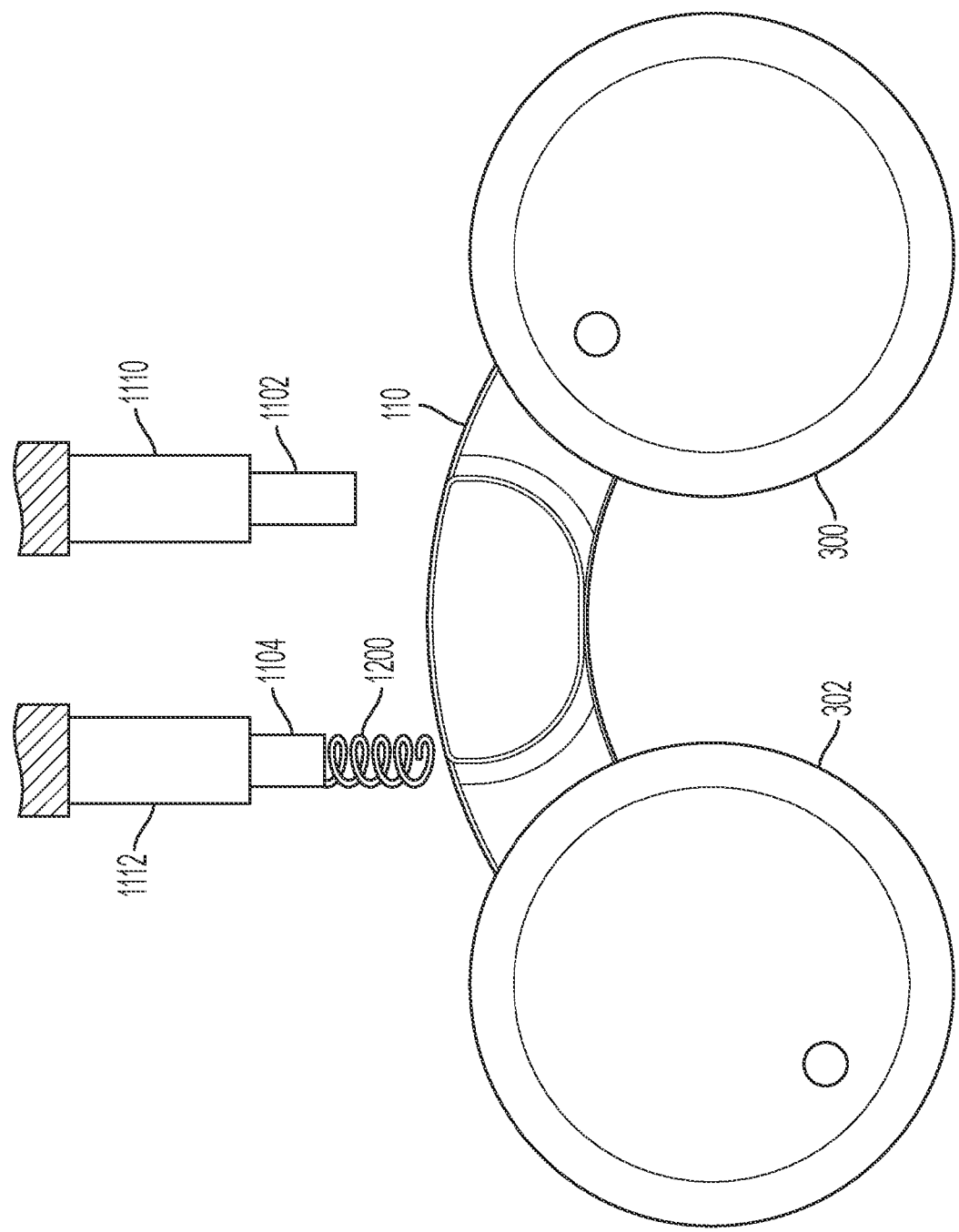
FIG. 12 is a diagram of a dynamic middle primary wheel engagement using the linear exterior endstop system, according to an embodiment of the present invention.

FIG. 12 is a diagram of dynamic middle primary wheel 106b engagement using the linear exterior endstop system 1110, according to an embodiment of the present invention. In an embodiment, each endstop 1102, 1104 can include a compliant member 1200 that engages the bogie 110. During a standard driving scenario of the robot 100, such as the second driving mode with passive articulation of the bogie 110 with limited articulation, the endstops 1102, 1104 are not engaged with the bogie 110. Each endstop 1102, 1104 is sufficiently, but not fully, retracted into its respective housing 1110, 1112 so that the robot 100 can negotiate smaller obstacles or conform to small environmental variations, such as, for example, grade changes, sidewalk crack, debris, rocks, and the like. During large obstacle negotiation such as climbing curbs, which may require the first drive mode, both endstops 1102, 1104 can be fully retracted into their respective housings 1110, 1112 to allow for a full range of articulation for the bogie 110.

In an embodiment, the compliant member 1200 is a spring, damper, cushion, or any elastomeric or compressible element or material. The use of a compliant member 1200 reduces the required engagement precision for contacting the bogie 110.

During a zero point turn, the middle primary wheel endstop 1104 dynamically lowers and the compliant member 1200 contacts the bogie 110, causing the bogie 110 to articulate downward and apply pressure to the middle primary wheel 106b. In an embodiment, the middle primary wheel endstop 1104 remains deployed for the duration of the turning operation.

In an embodiment, one or more endstops 1102, 1104 can include a force sensor that can provide closed loop feedback of the force applied by the endstop 1102, 1104 and/or the position of the endstop 1102, 1104.

In yet another embodiment, the front primary wheel endstop 1102 can also be actuated, or can be in a permanent or semipermanent fixed position.

Figure 13:
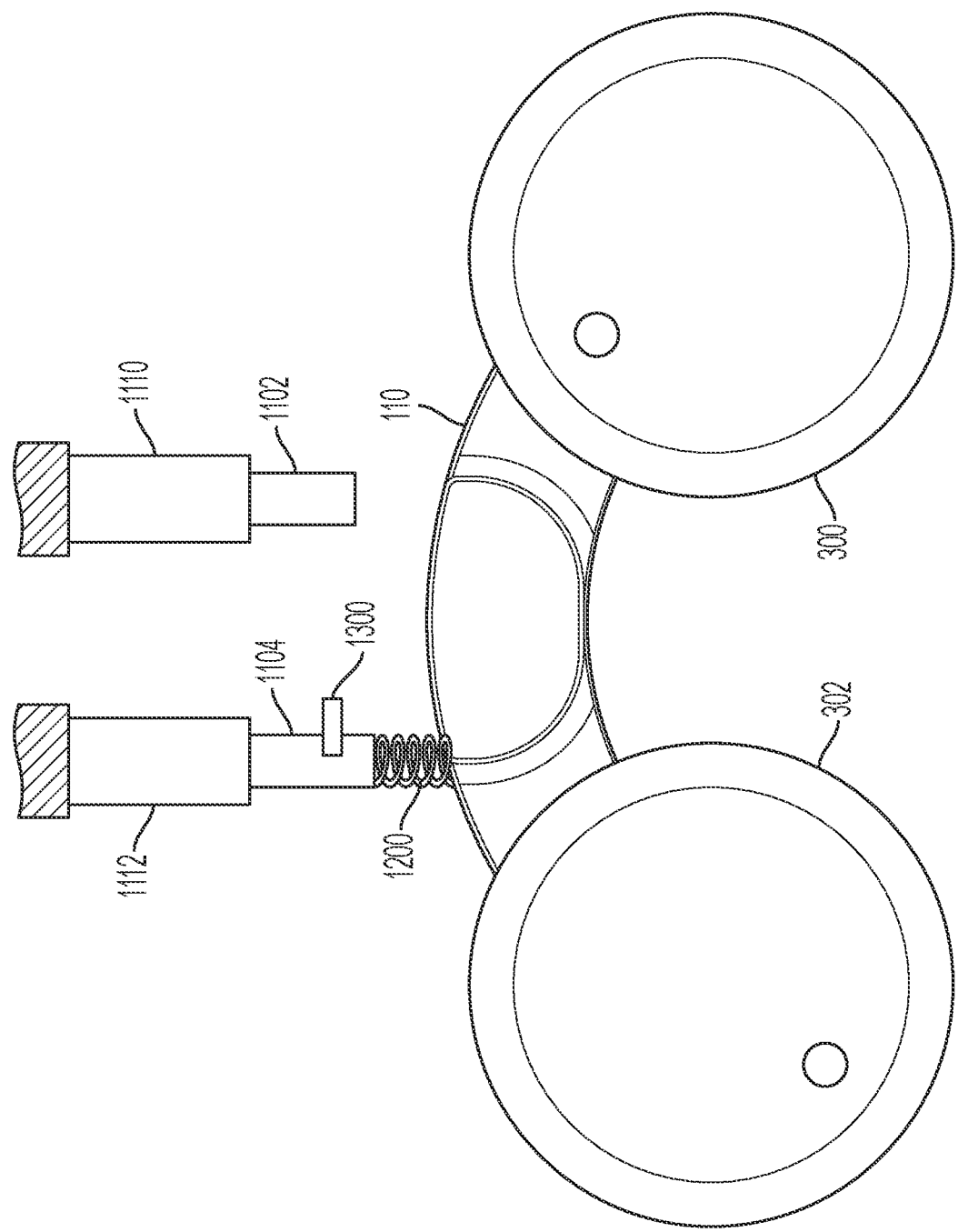
FIG. 13 is a diagram of continuous middle primary wheel engagement using the linear exterior endstop system, according to an embodiment of the present invention.

FIG. 13 is a diagram of continuous middle primary wheel 106b engagement using the linear exterior endstop system 1100, according to an embodiment of the present invention. During a standard driving scenario of the robot 100, such as the second driving mode with passive articulation of the bogie 110 with limited articulation, the middle primary wheel endstop 1104 is deployed and the compliant member 1200 is in continuous contact with the bogie 110. The compliant member 1200 is engineered so that its compliance and deflection properties allow for a standard range of articulation when engaged. In this embodiment, a locking mechanism 1300 can be employed to relieve the actuator 1108 from providing continuous deployment force. Once the middle primary wheel endstop 1104 is deployed, the locking mechanism 1300 can hold the middle primary wheel endstop 1104 in the deployed position, without requiring the actuator 1108 to continue to provide deployment force.

Figure 14:
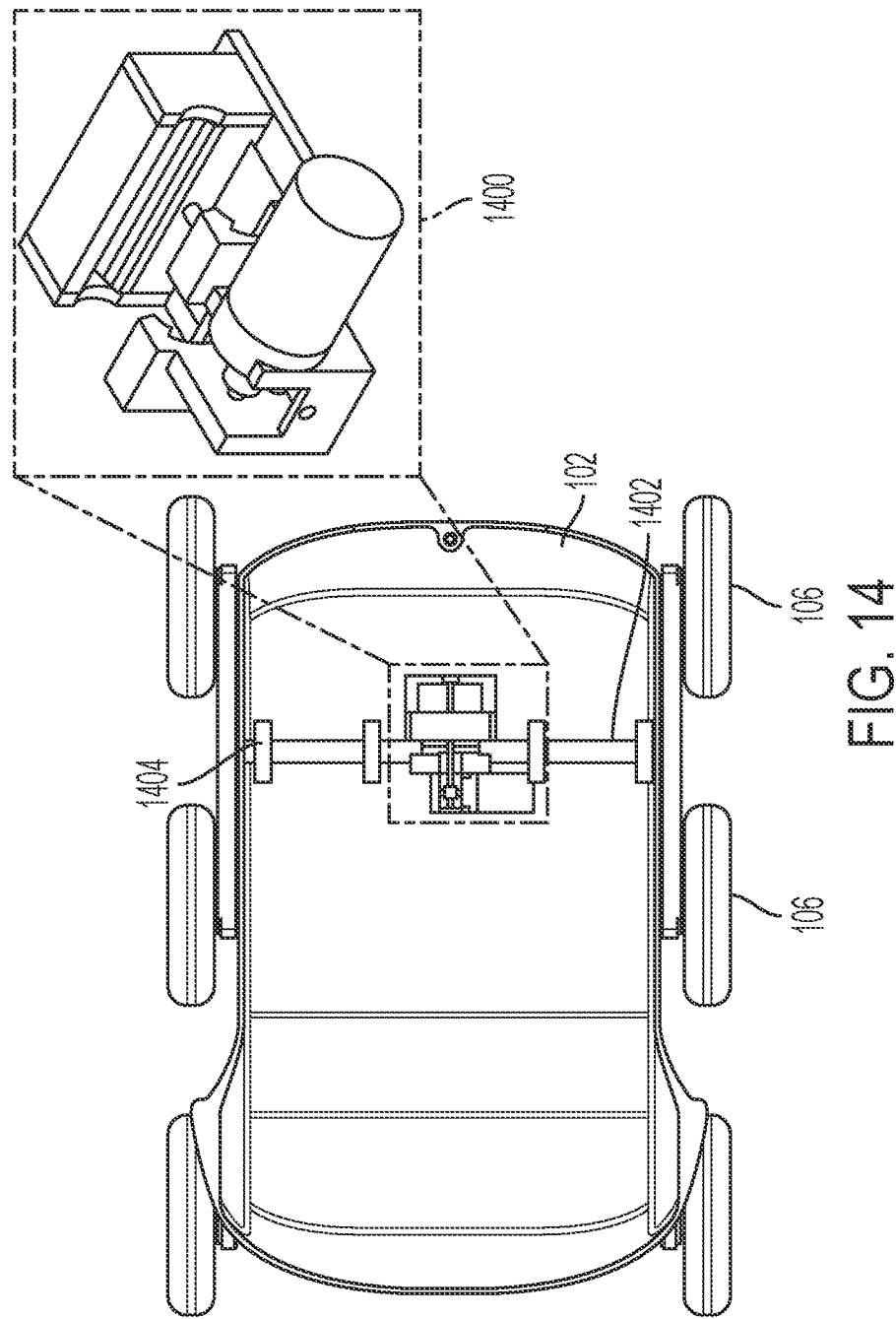
FIG. 14 is a perspective view of the top of a single actuator system for the bogies and an enlarged view of a single actuator, according to an embodiment of the present invention.

FIG. 14 is a perspective view of the top of a single actuator system for the bogies 110 and an enlarged view of a single actuator 1400, according to an embodiment of the present invention. In an embodiment, instead of the linear exterior endstop system 1100 described herein, the robot 100 can include the single actuator 1400 as shown in FIG. 14, where independent bogie axles 1402 are mounted to the single actuator 1400. The bogie axles 1402 are respectively secured to the drive train via a pair of bearing blocks 1404, and coupled to each respective bogie 110. In this embodiment, each respective bogie 110 can be independently articulated, allowing for enhanced environmental contouring. The single actuator 1400 is described in more detail with respect to FIGS. 16 and 17.

In another embodiment, a single bogie axle (not shown) traverses the entire width of the drive train so that each bogie 110 is coupled to opposite ends of the single bogie axle.

Figure 15:
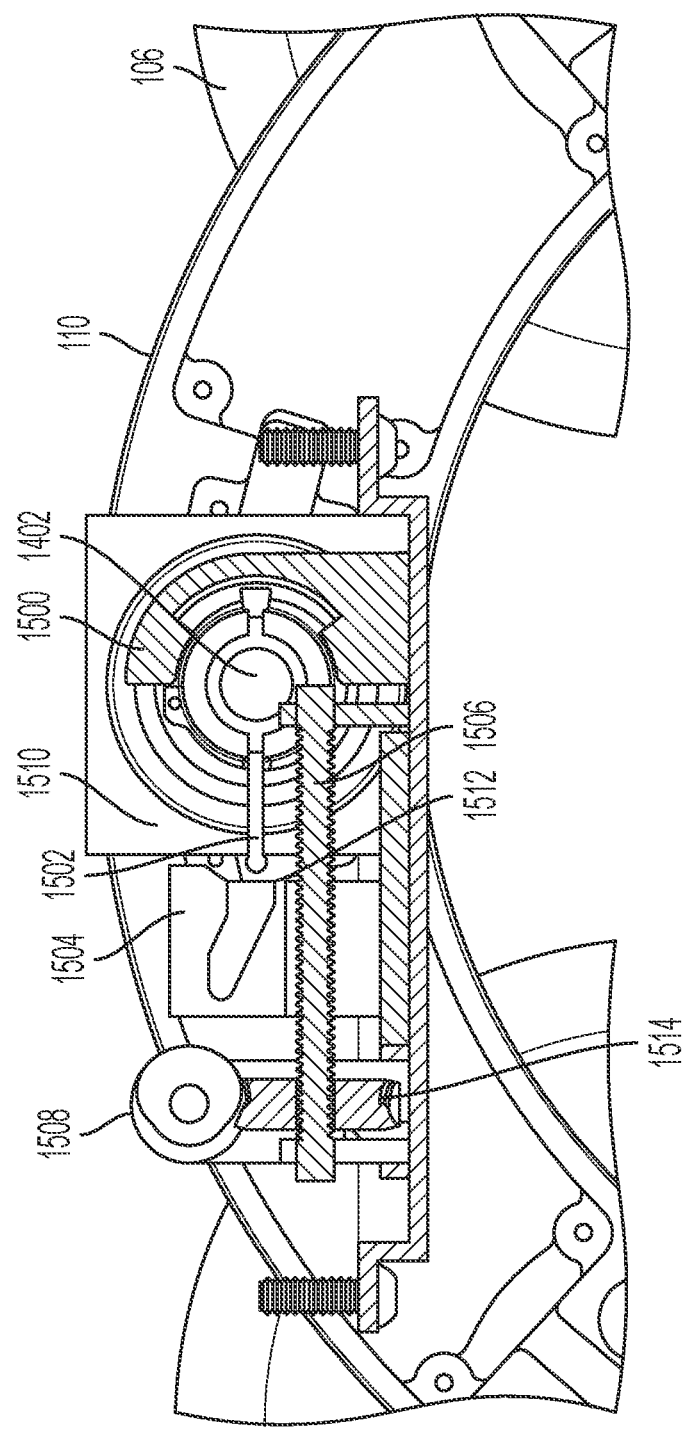
FIG. 15 is a lateral side view of a single actuator system for the bogies, according to an embodiment of the present invention.

FIG. 15 is a lateral side view of a single actuator system for the bogies 110, according to an embodiment of the present invention. The single actuator system is coupled to the bogie axle 1402, and includes an outer endstop 1500 which is configured to capture a rear portion of a spring finger 1502. In an embodiment, the outer endstop 1500 defines a large articulation range for the bogie 110, and protects the primary wheels 106 from contacting exterior surfaces or components on the container 102. An endstop block 1504 is configured to capture a tip of the spring finger 1502, which results in application of passive or active pressure on the middle primary wheel 106b, which is described in more detail herein. In an embodiment, the endstop block 1504 is coupled to a threaded rod 1506 which is actuated by a worm gear 1514 driven by a motor 1508. The endstop block 1504 is configured to move in a linear fashion on a dovetail slide, or a similar mechanism such as parallel rails. As the motor 1508 actuates the worm gear 1514 in a forward fashion, the threaded rod 1506 rotates in a first direction, the endstop block 1504 moves towards the spring finger 1502. Conversely, as the motor 1508 actuates the worm gear 1514 in a reverse fashion, the threaded rod 1506 rotates in a second direction opposite the first direction, the endstop block 1504 moves away from the spring finger 1502. In an embodiment, the endstop block 1504 includes angled lead-in surfaces 1510, 1512 which serve to guide the spring finger 1502 into the endstop block 1504.

In an embodiment, the motor 1508 includes a gearbox (not shown) and an encoder (not shown). The worm gear 1514 is advantageously utilized as it is inherently not back drivable, which ensures that no static load is placed on the motor 1508 while a desired position of the bogie axle 1402 and/or bogie 110 is maintained.

Figure 16:
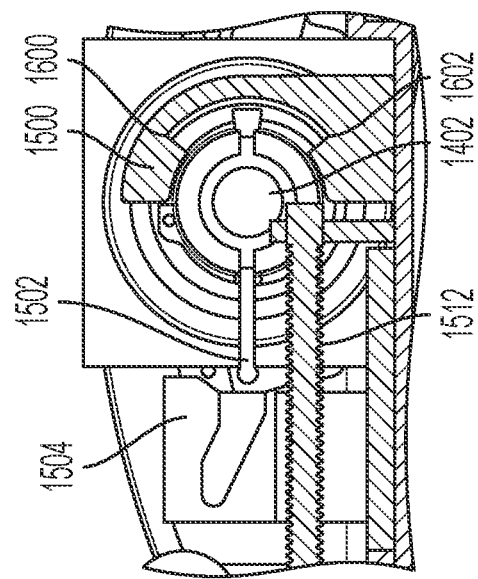
FIG. 16 is a diagram depicting a passive state of the single actuator system which provides for a large articulation range for the bogie, according to an embodiment of the present invention.

FIG. 16 is a diagram depicting a passive state of the single actuator system which provides for a large articulation range for the bogie 110, according to an embodiment of the present invention. As shown in FIG. 16, the outer endstop 1500 includes an upper stop 1600 and lower stop 1602. The upper and lower stops 1600, 1602 define a range of articulation for the bogie 110. In the passive state that provides for a large articulation range, the rear portion of the spring finger 1502 is positioned within the outer endstop 1500, however, the tip of the spring finger 1502 remains outside of the endstop block 1504. In this state, the rotation of the spring finger 1502 is only limited by the upper and lower stops 1600, 1602.

Figure 17:
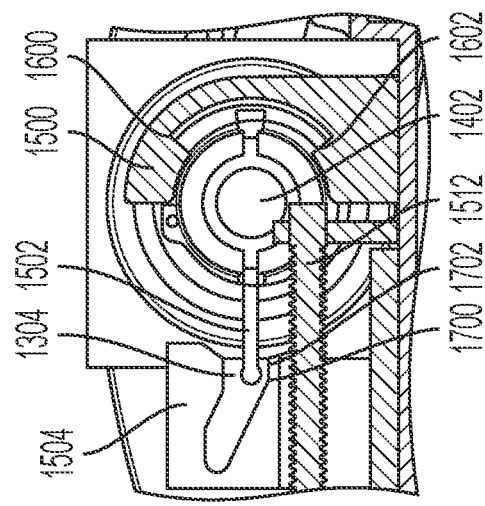
FIG. 17 is a diagram depicting a passive state of the single actuator system which provides for a limited articulation range for the bogie, according to an embodiment of the present invention.

FIG. 17 is a diagram depicting a passive state of the single actuator system which provides for a limited articulation range for the bogie 110, according to an embodiment of the present invention. In order to provide a limited articulation range for the bogie 110, the motor 1508 actuates the worm gear 1514 so that threaded rod 1506 rotates and causes the endstop block 1504 to move towards the tip of the spring finger 1502 and capture the spring finger 1502 within a first portion 1700 of the endstop block 1504. The first portion 1700 includes relatively parallel upper and lower surfaces 1702, 1704, which define a range of articulation for the bogie 110. As shown in FIG. 17, the upper and lower surfaces 1702, 1704 do not actively apply pressure to the tip of the spring finger 1502, thereby allowing free movement of the spring finger 1502 in a limited range between the upper and lower surfaces 1702, 1704.

Figure 18:
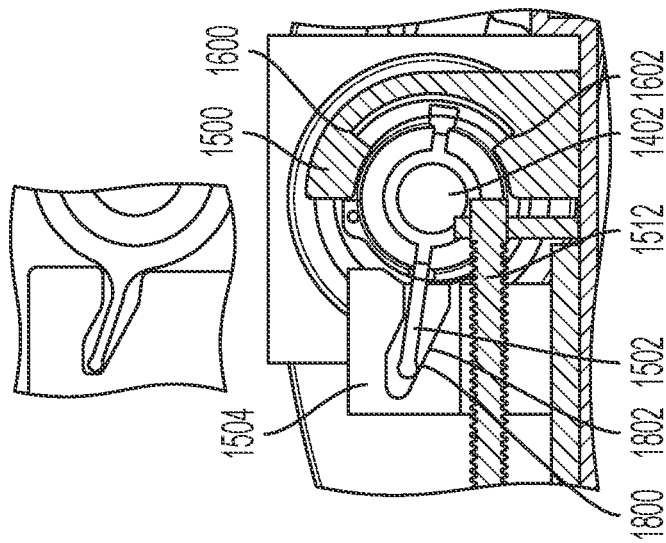
FIG. 18 is a diagram depicting an active state of the single actuator system, according to an embodiment of the present invention.

FIG. 18 is a diagram depicting an active state of the single actuator system, according to an embodiment of the present invention. In the active state, the motor 1508 actuates the worm gear 1514 so that the threaded rod 1506 rotates and causes the endstop block 1504 to move towards the tip of the spring finger 1502 until the spring finger 1502 is within a second portion 1800 of the endstop block 1504. The second portion 1800 includes an angled surface 1802 which contacts the tip of the spring finger 1502, and actively applies upward pressure to the spring finger 1502, causing the spring finger 1502 to tilt upward. The upward tilting of the spring finger 1502 results in the bogie axle 1402 rotating so that the bogie 110 articulates. Varying degrees of active pressure can be applied to the spring finger 1502 by the endstop block 1504 based on how far up the angled surface 1802 the tip of the spring finger 1502 travels. In addition, the degree of the angled surface 1802 can be varied by using different endstop blocks. The stiffness of the spring finger 1502 can be tuned to provide a limited range of articulation while active pressure is being applied to the middle primary wheel 106, thereby resulting in enhanced environmental contouring.

Conversely, the motor 1508 can be actuated in a reverse direction so that the worm gear 1514 so that the threaded rod 1506 rotates and causes the endstop block 1504 to travel away from the tip of the spring finger 1502. Such actuation reduces the amount of active pressure applied to the spring finger 1502 by the endstop block 1504 as the tip of the spring finger 1502 travels down the angled surface 1802.

In an embodiment, the outer endstop 1500, spring finger 1502, and endstop block 1504 can be made from an elastomeric material, such as, but not limited to, acrylic resin, polycarbonate resin, polyethylene terephthalate resin, a thermo-setting or photo-setting polymer such as epoxy resin, rubber such as synthetic rubber, polybutadiene rubber and nitrile rubber, or a polymeric elastomer such as styrene butadiene elastomer and styrene isoprene elastomer, and combinations thereof. In an embodiment, the outer endstop 1500, spring finger 1502, and endstop block 1504 can be formed from different materials, as well as from elastomers having different properties.

In another embodiment, the outer endstop 1500, spring finger 1502, and endstop block 1504 can be made of a metallic material that may be heat treated to obtain a desired stiffness, as well as a composite material which may have a unique construction that achieves a desired stiffness. Such metallic material can include, but are not limited to, steel, aluminum, carbon steel, alloy steel, stainless steel, iron, magnesium, copper, brass, bronze, zinc, and various composites and alloys thereof.

In an embodiment, the bogie axle 1402 can include at least one sensor to measure the angular rotation of the bogie axle 1402 with respect to the container 102. If the angle of the bogie axle 1402 is beyond the lead-in surfaces 1510, 1512, actuation of the motor 1508 is prevented in order to prevent damage to the components of the single actuation system. Various sensors can be utilized to measure the angular rotation of the bogie axle 1402, and can include, but is not limited to, photodiode detection of a reflective sticker on the bogie axle 1402, an incremental encoder, a rotary encoder, a differential transformer, an inductive sensor, a rotary potentiometer, an optical encoder, a magnetic sensor, a variable reluctance sensor, a Hall-effect sensor, a magnetic vane sensor, and the like.

Figure 19:
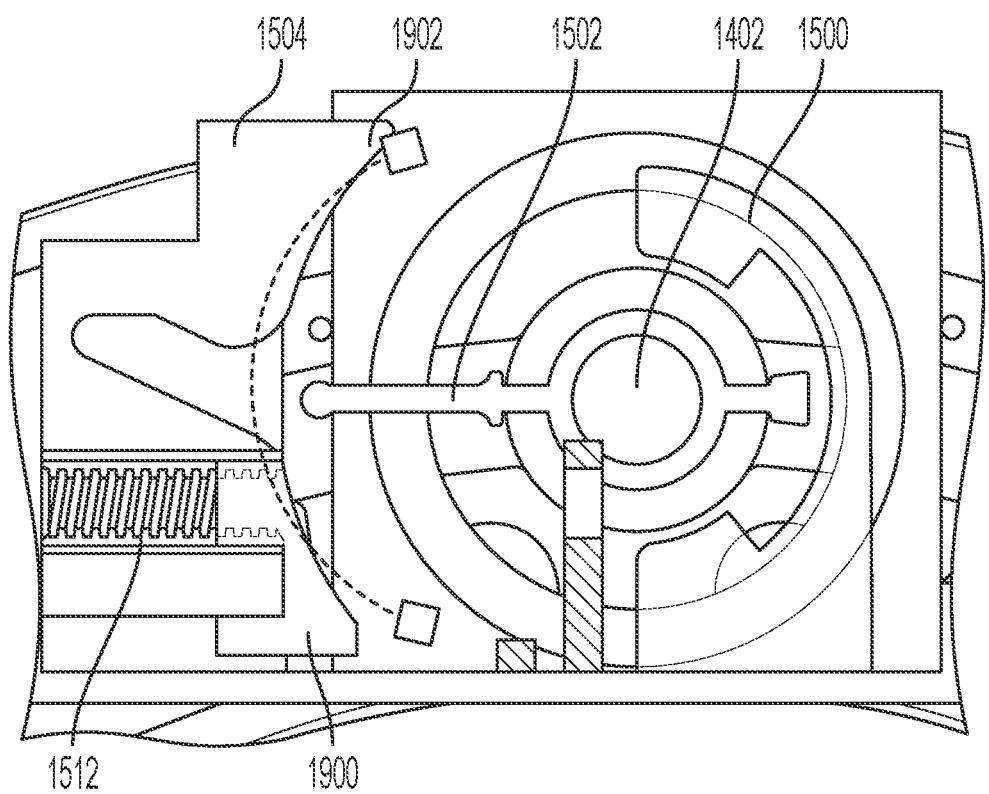
FIG. 19 is a lateral side view of the single actuator system for the bogies with an endstop block having expanded lead-in surfaces, according to an embodiment of the present invention.

FIG. 19 is a lateral side view of the single actuator system for the bogies 110 with an endstop block 1504 having expanded lead-in surfaces 1900, 1902, according to an embodiment of the present invention. In an alternative embodiment which may not require a sensor to measure the angular rotation of the bogie axle 1402, the endstop block 1504 can have expanded lead-in surfaces 1900, 1902. In this embodiment, the expanded lead-in surfaces cover a full articulation range of the bogie 110, and the tip of the spring finger 1502 is ensured to be captured within the endstop block 1504 as the motor 1508 actuates the worm gear 1514 and causes the threaded rod 1512 to move the endstop block 1504 towards the spring finger 1502.

Figure 20:
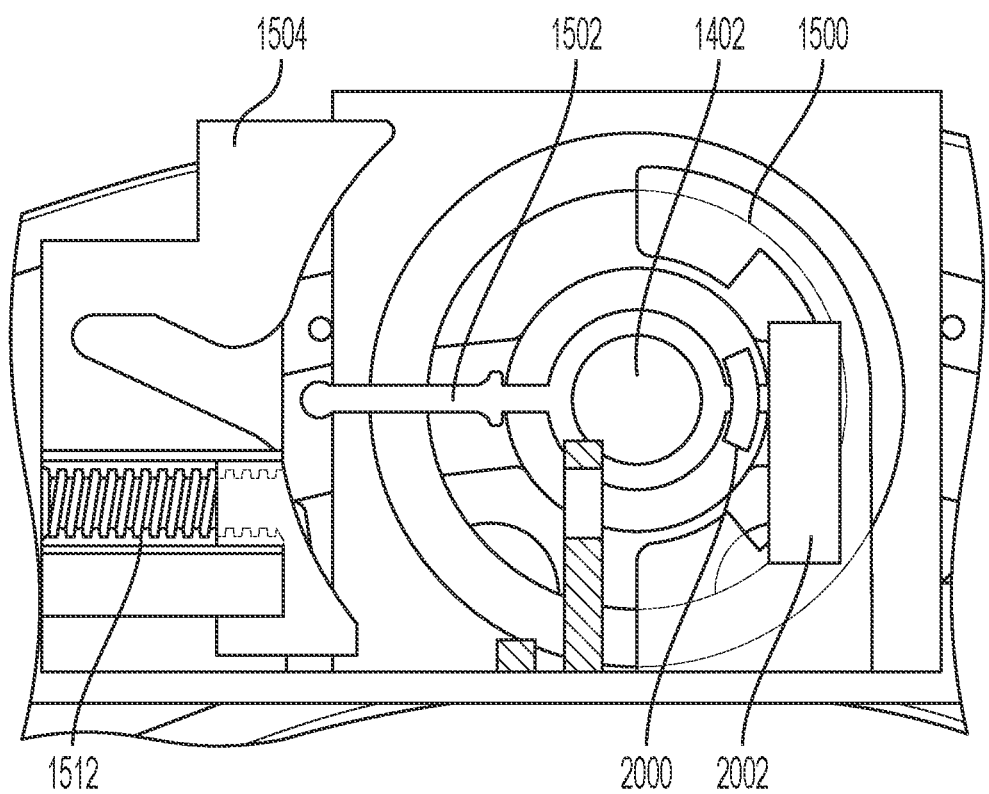
FIG. 20 is a lateral side view of the single actuator system for the bogies with a key and switch mechanism, according to an embodiment of the present invention.

FIG. 20 is a lateral side view of the single actuator system for the bogies 110 with a key 2000 and switch 2002 mechanism, according to an embodiment of the present invention. In an alternative embodiment which may not require a sensor to measure the angular rotation of the bogie axle 1402, a key 2000 is located on the rear portion of the spring finger 1502. A switch 2002 is disposed proximate to the rear portion of the spring finger 1502 and the outer endstop 1500. When the key 2000 comes into contact with the switch 2002, the endstop block 1504 is permitted to move. When the key 2000 does not contact the switch 2002 however, the endstop block 1504 is not permitted to move. Thus, if the spring finger 1502 rotates beyond a predetermined amount, the key 2000 would not be in contact with the switch 2002, disabling the movement of the endstop block 1504 or actuation of the motor 1508. The switch 2002 can be coupled to a mechanical relay, a solid state relay, and the like, or to a software based control which blocks power to the motor 1508.

Figure 21:
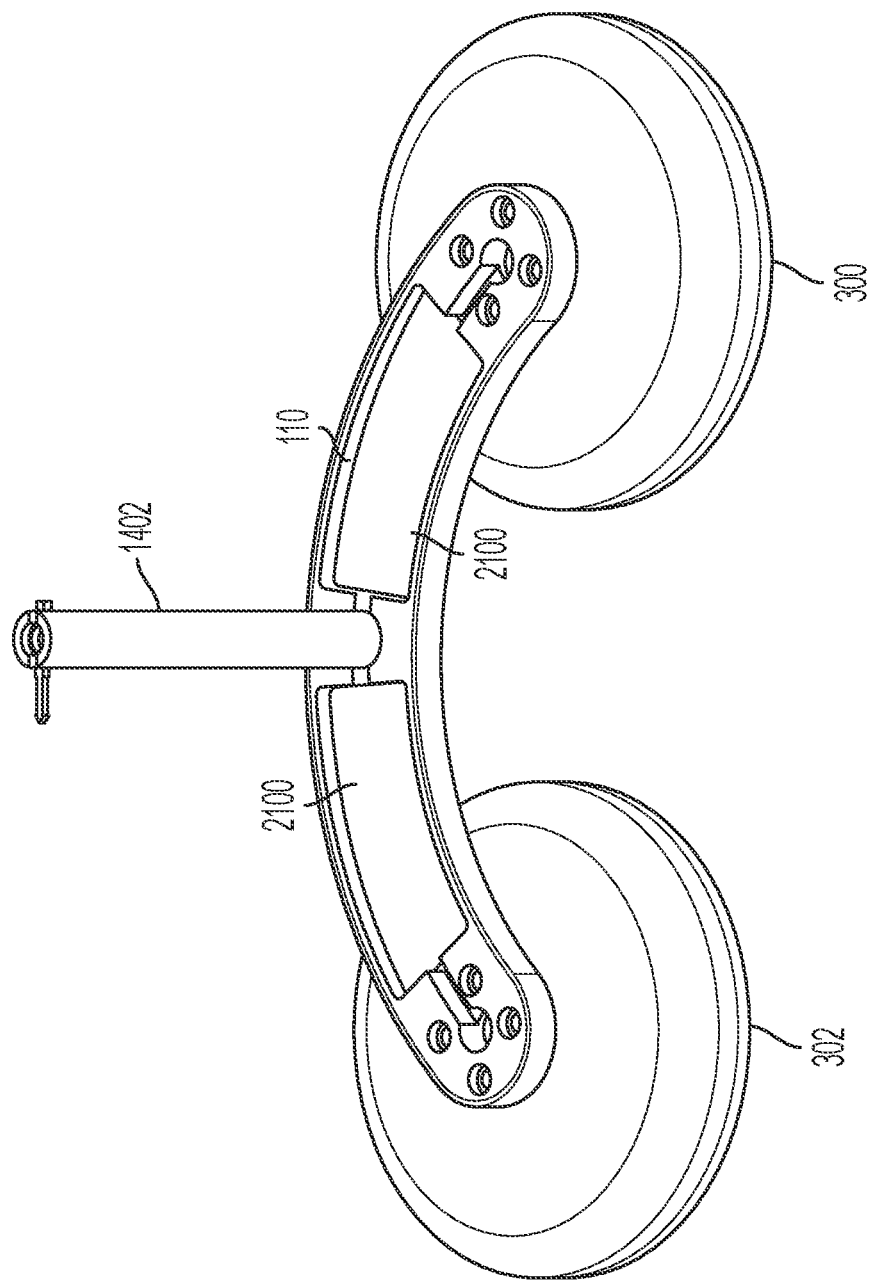
FIG. 21 is a perspective view of an inner surface of the bogie, according to an embodiment of the present invention.

FIG. 21 is a perspective view of an inner surface of the bogie 110, according to an embodiment of the present invention. The bogie 110 can include motor controllers 2100 disposed within the bogie 110. Such a configuration allows for simplified wiring and facilitates maintenance, repair, and replacement of the wheels 106, 108, motor controllers 2100, and/or the bogies 110, as well as any related hardware.

Figure 22:
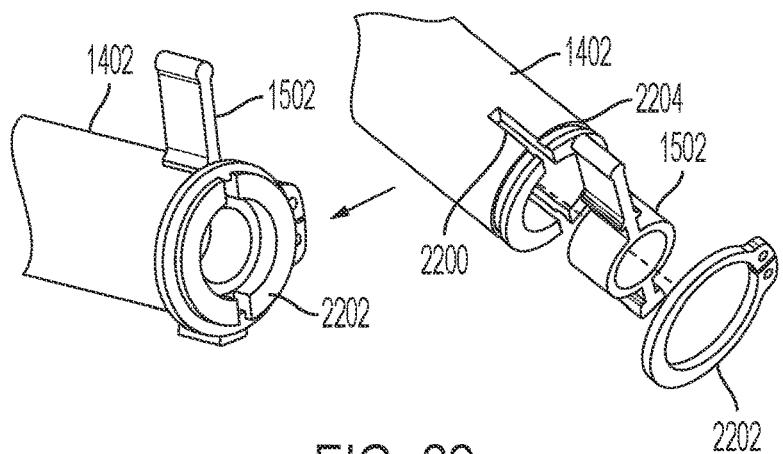
FIG. 22 is a perspective view of a spring finger and bogie axle assembly, according to an embodiment of the present invention.

FIG. 22 is a perspective view of a spring finger 1502 and bogie axle 1402 assembly, according to an embodiment of the present invention. The bogie axle 1402 can include a slot 2200 which is dimensioned to capture the tip of the spring finger 1502. Once the spring finger 1502 is inserted into the slot 2200, a circlip 2202 is used to secure the spring finger 1502 to the bogie axle 1402. In an embodiment, the bogie axle 1402 includes a channel 2204 into which the circlip 2202 can be disposed.

Figure 23:
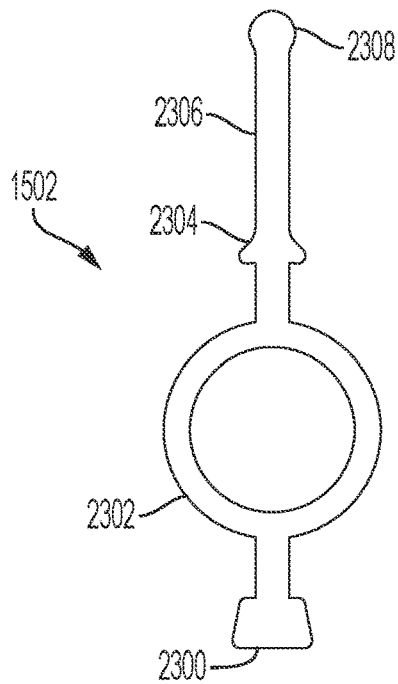
FIG. 23 is an exemplary depiction of the spring finger, according to an embodiment of the present invention.

FIG. 23 is an exemplary depiction of the spring finger 1502, according to an embodiment of the present invention. The spring finger 1502 includes a rear portion 2300, an annular portion 2302 configured to fit into the bogie axle 1402, a flange 2304 that is configured to rest on the bogie axle 1402 after the spring finger 1502 is inserted into the slot 2200, an elongated front portion 2306, and a tip 2308. In an embodiment, the tip 2308 has a rounded shape which facilitates durability and mitigates material wear over time as the tip 2308 slides into and out of the endstop block 1504. In the event of material wear however, the spring finger 1502 and endstop block 1504 can be easily replaced as these components are simple to manufacture at a low cost.

Figure 24:
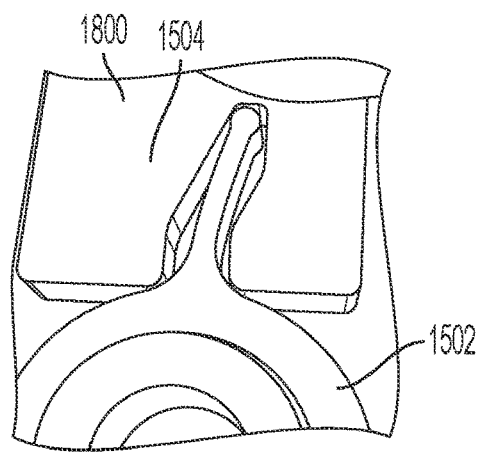
FIG. 24 is an exemplary depiction of a spring finger inserted into an endstop block in an active state, according to an embodiment of the present invention.

FIG. 24 is an exemplary depiction of a spring finger 1502 inserted into an endstop block 1504 in an active state, according to an embodiment of the present invention. In an active state, the tip 2308 of the spring finger 1502 is fully inserted into the endstop block 1504, so that the elongated front portion 2306 tilts and deflects as it travels along the angled surface 1802.

Figure 25:
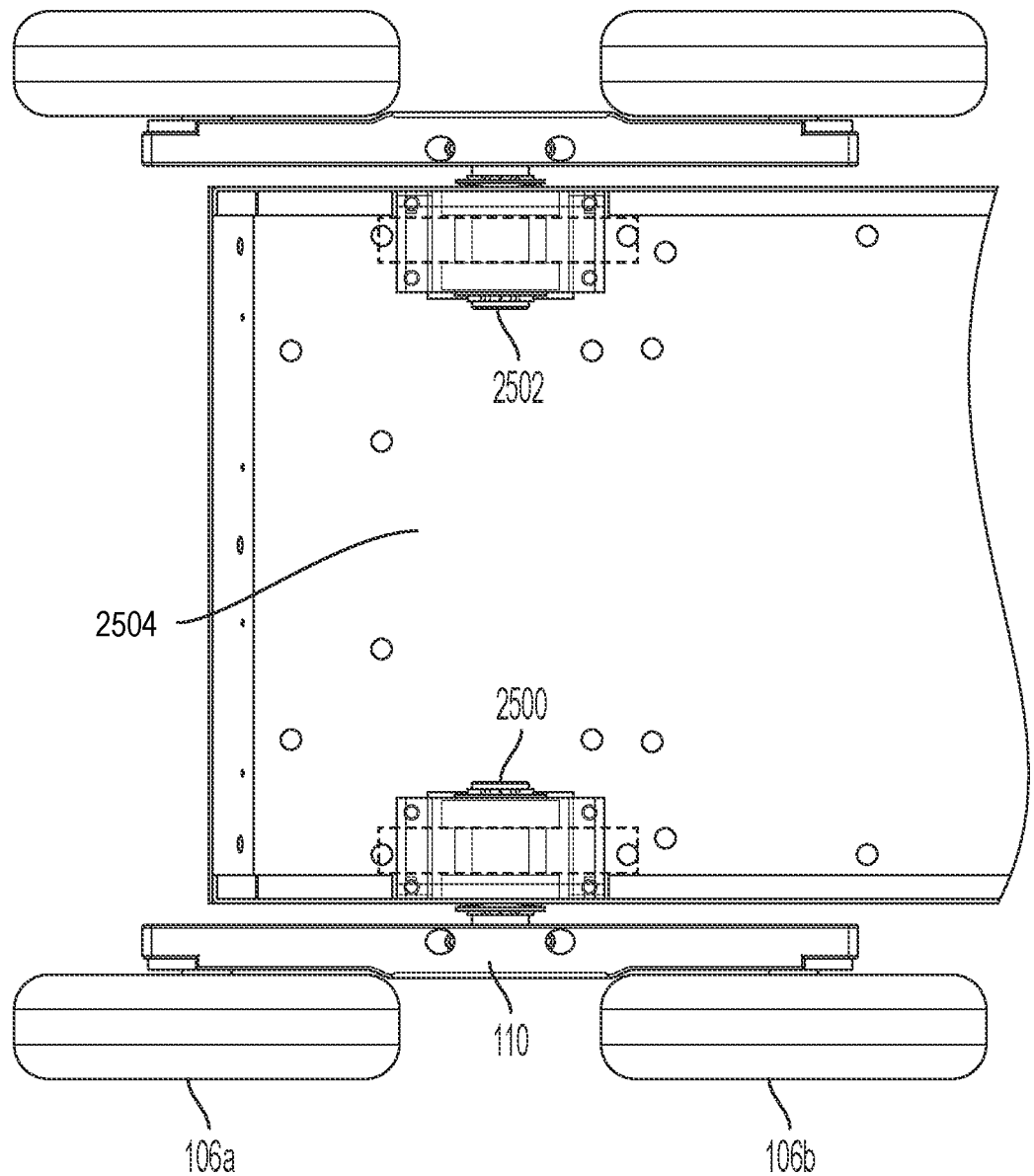
FIG. 25 is a perspective view of a top of a dual actuator system for the bogies, according to an embodiment of the present invention.

FIG. 25 is a perspective view of a top of a dual actuator system for the bogies 110, according to an embodiment of the present invention. In an alternative to the linear exterior endstop system disclosed herein, each bogie 110 includes an independent actuator 2500, 2502, respectively. In this embodiment, there is no bogie axle that traverses the space 2504 between the opposing bogies 110, thus allowing the space 2504 to be used for utility purposes (i.e., deeper container depth, extra storage, additional electronics components, etc.).

Figure 26:
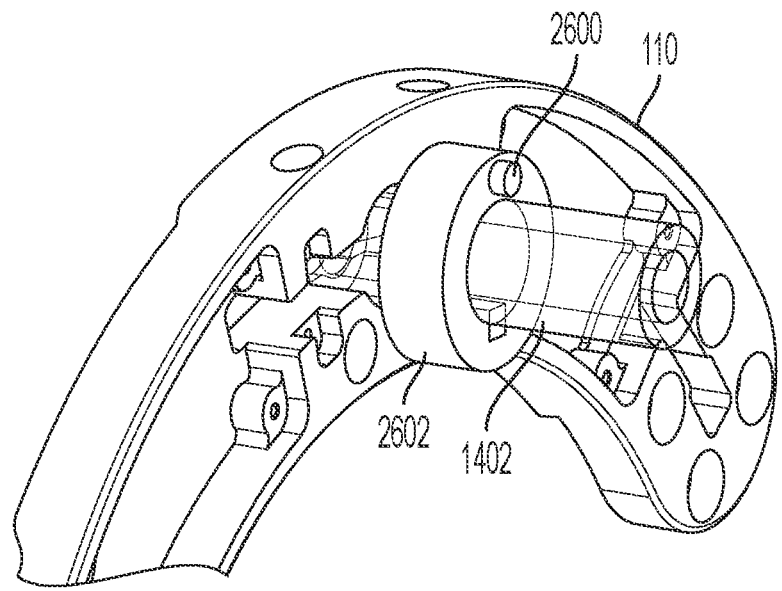
FIG. 26 is a perspective view of the bogie with a collar having an indexing pin, according to an embodiment of the present invention.

FIG. 26 is a perspective view of the bogie 110 with a collar 2602 having an indexing pin 2600, according to an embodiment of the present invention. In an alternative to the linear exterior endstop system disclosed herein, each bogie 110 can include an indexing pin 2600 located on a collar 2602 of the bogie 110. The bogie axle 1402 is configured to mate with the collar 2602.

Figure 27:
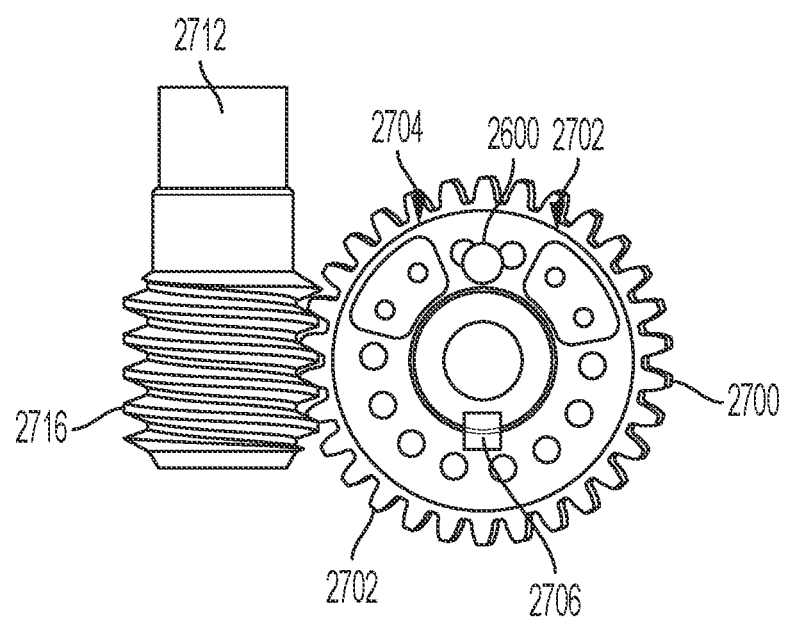
FIG. 27 is a lateral side view of a dynamic travel window system utilizing an indexing pin, according to an embodiment of the present invention.

FIG. 27 is a lateral side view of a dynamic travel window system utilizing an indexing pin 2600, according to an embodiment of the present invention. The dynamic travel window system includes a disk 2700 that is mounted co-axially with the bogie axle 1402. The disk 2700 contains a front primary wheel endstop 2702 and a middle primary wheel endstop 2704 that provides a fixed articulation range for the bogie 110. In an illustrative embodiment, the endstops 2702, 2704 are spaced apart so that the bogie 110 is permitted to articulate +/−45° in either direction. The articulation range disclosed is for illustrative purposes only, and the bogie 110 could be allowed to articulate from +/−90° if required by adjusting the spacing of the endstops 2702, 2704 with respect to one another.

In an embodiment, one or both endstops 2702, 2704 may have a compliant member that engages the indexing pin 2600.

In an embodiment, the perimeter of the disk 2700 includes threads 2708 that engage with a worm screw 2708. The worm screw 2708 is actuated by a motor 2712. This configuration is very difficult to back drive, and allows for a small, low-cost motor 2712 to be utilized.

The disk 2700 can further include an encoder 2706 that measures the displacement of the bogie axle 1402 relative to the container 102. In an alternative embodiment, the motor 2712 can include an encoder (not shown) and a homing switch (not shown) that is used to determine a zero position on startup.

Figure 28:
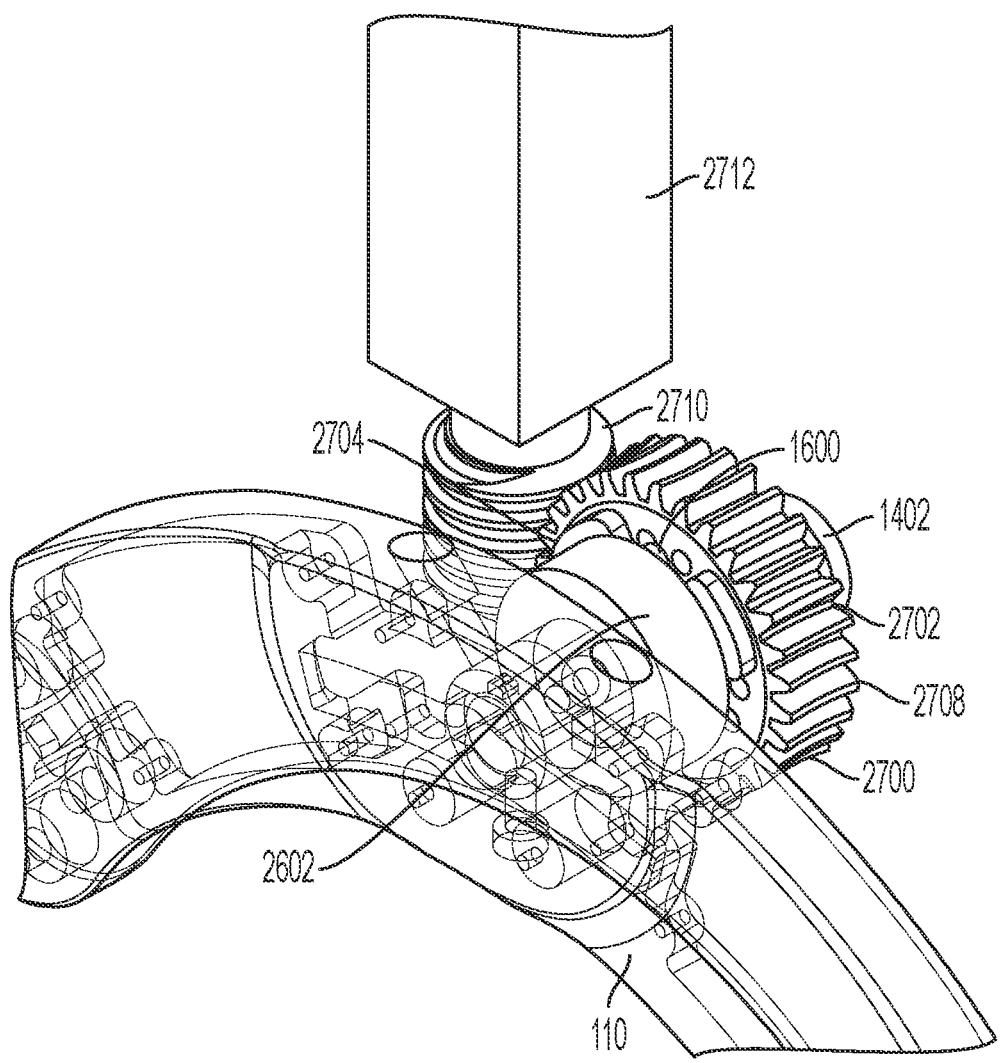
FIG. 28 is a perspective view of the dynamic travel window system utilizing an indexing pin, according to an embodiment of the present invention.

FIG. 28 is a perspective view of the dynamic travel window system utilizing an indexing pin 2600, according to an embodiment of the present invention. The dynamic travel window system can provide for dynamic and/or continuous engagement between the indexing pin 2600 and the middle primary wheel endstop 2704. For example, during a first driving mode which may require climbing of a curb, the motor 2712 actuates the disk 2700 such that the disk 2700 is always centered over the indexing pin 2600, via, for example, closed loop feedback control, therefore allowing for full articulation of the bogie 110.

Figure 29:
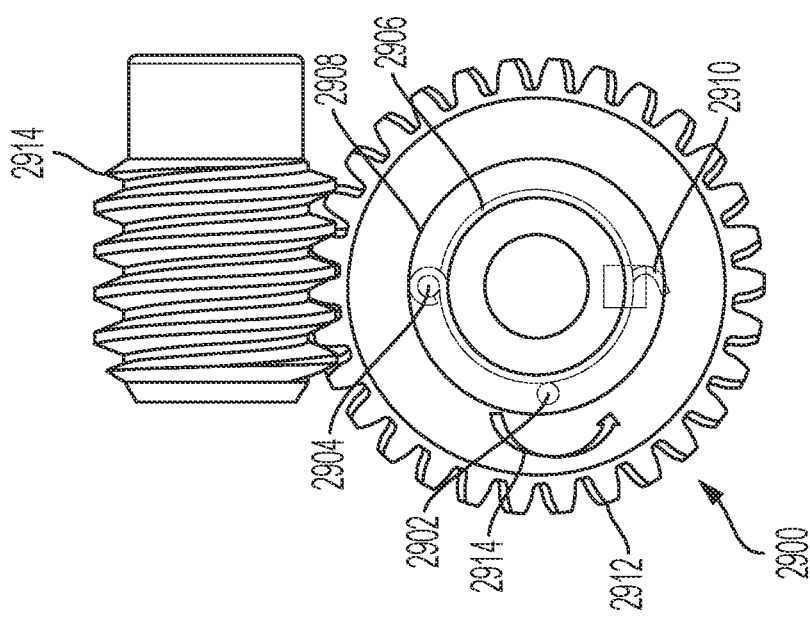
FIG. 29 is a lateral side view of a single torsional actuator system, according to an embodiment of the present invention.

FIG. 29 is a perspective view of a single torsional actuator system, according to an embodiment of the present invention. In an alternative to the linear exterior endstop system disclosed herein, the single torsional actuator system includes a disk 2900 with an endstop pin 2902 and a mounting pin 2904. A torsion spring 2906 is co-axially mounted on the disk 2900 relative to the bogie axle 1402. The torsion spring 2906 includes a mounting hook 2908 that is configured to engage the mounting pin 2904, as well as an endstop hook 2910. The endstop hook 2910 is configured to engage the endstop pin 2902 as the disk 2900 rotates in the direction indicated by the arrow 2914.

In an embodiment, the endstop pin 2902 is selectively retractable so that it is not engageable with the endstop hook 2910, in order to allow a full range of articulation for the bogie 110.

Figure 30:
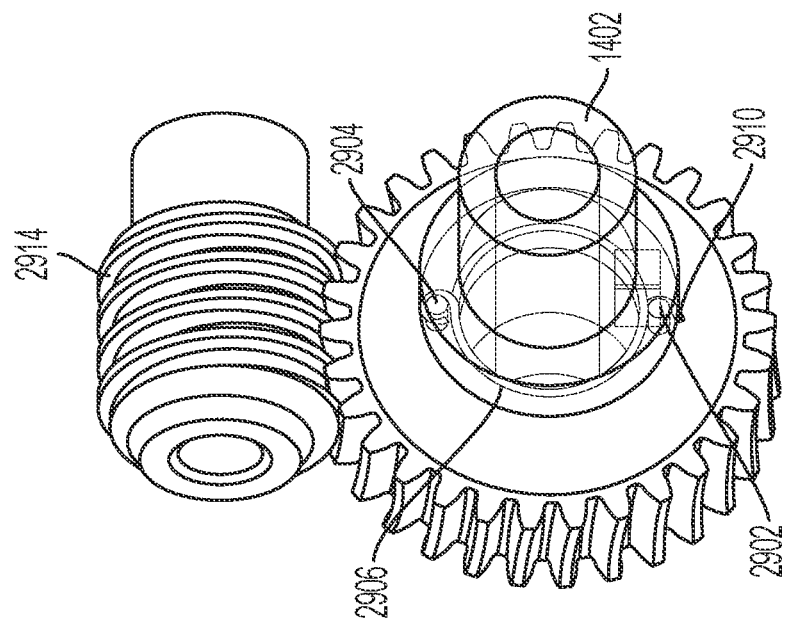
FIG. 30 is a perspective view of the single torsional actuator system, according to an embodiment of the present invention.

FIG. 30 is a perspective view of the single torsional actuator system, according to an embodiment of the present invention. FIG. 30 shows the bogie axle 1402 coupled to the single torsional actuator system, and where the endstop hook 2910 is engaged with the endstop pin 2902. In an embodiment, the endstop pin 2902 can be continuously engaged to compress the torsion spring 2906 so that an optimal amount of torsion can be dialed in.

Figure 31:
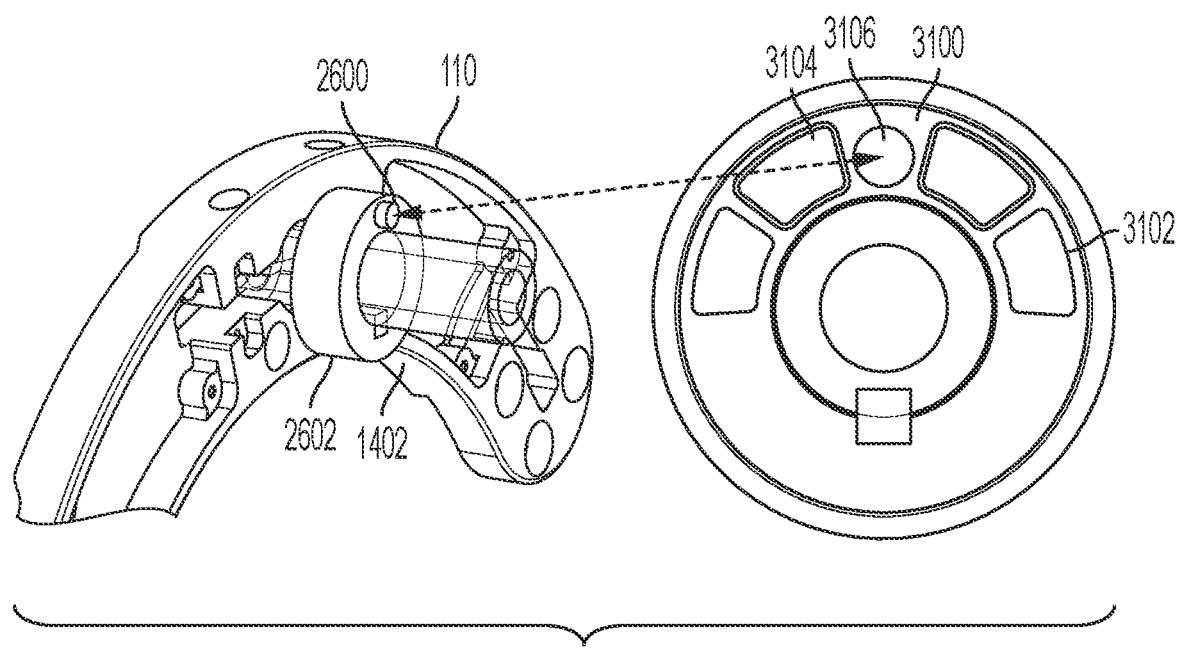
FIG. 31 is a cross-sectional view of a binary clutch endstop system, according to an embodiment of the present invention.

FIG. 31 is a cross-sectional view of a binary clutch endstop system, according to an embodiment of the present invention. In an alternative to the linear exterior endstop system disclosed herein, the binary clutch endstop system includes an outer endstop disk 3100 that includes outer endstops 3102. The outer endstop disk 3100 is co-axially mounted to the bogie axle 1402 with an inner endstop disk 3200, shown in more detail in FIG. 32. The inner endstop disk 3200 includes inner endstops 3104. The indexing pin 2600, as shown in FIG. 26, is received into a receptacle 3106 to engage the bogie 110 to the binary clutch endstop system.

The inner endstop disk 3200 allows for a small range of articulation for the bogie 110, and permits the bogie 110 to articulate +/−5° in either direction. In an embodiment, the inner endstops 3104 may feature springs or dampers to better control interaction with the indexing pin 2600.

The outer endstop disk 3100 allows a larger range of articulation for the bogie 110 than the inner endstop disk 3200, and permits the bogie 110 to articulate +/−45° in either direction. In an embodiment, the outer endstop disk 3100 serves to be a final limit to stop the primary wheels 106 from contacting with, or crashing into, the container 102.

Figure 32:
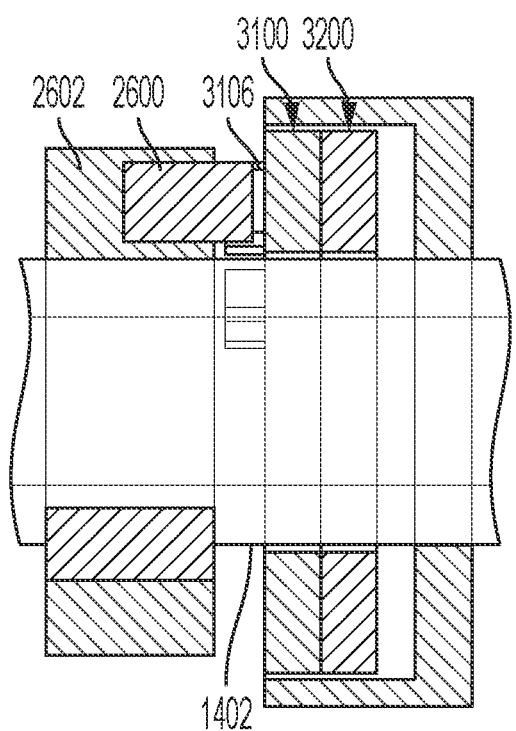
FIG. 32 is a lateral view of the binary clutch endstop system, according to an embodiment of the present invention.

FIG. 32 is a lateral view of the binary clutch endstop system, according to an embodiment of the present invention. As shown in FIG. 32, the indexing pin 2600 is received by the receptacle 3106, and rotation of bogie axle 1402 is limited by the outer endstop disk 3100 and inner endstop disk 3200.

In an embodiment, the inner endstop disk 3200 can be biased to be coincident with a rear face of the outer endstop disk 3100. The inner endstop disk 3200 can further be actuated, such as via a solenoid or mechanical gear assembly, against a spring bias such that the inner endstops 3104 are retracted below the surface of the outer endstop disk 3100. In this state, the inner endstops 3104 no longer make contact with the indexing pin 2600, for example, when the robot 100 is required to climb a curb.

In this embodiment, if power is lost, such as to the solenoid, the inner endstop disk 3200 is automatically forced back against the outer endstop disk 3100 so that the inner endstops 3104 are capable of making contact with the indexing pin 2600.

In another embodiment, the inner endstop disk 3200 can have lead-in surfaces to help facilitate alignment with the indexing pin 2600.

Figure 33:
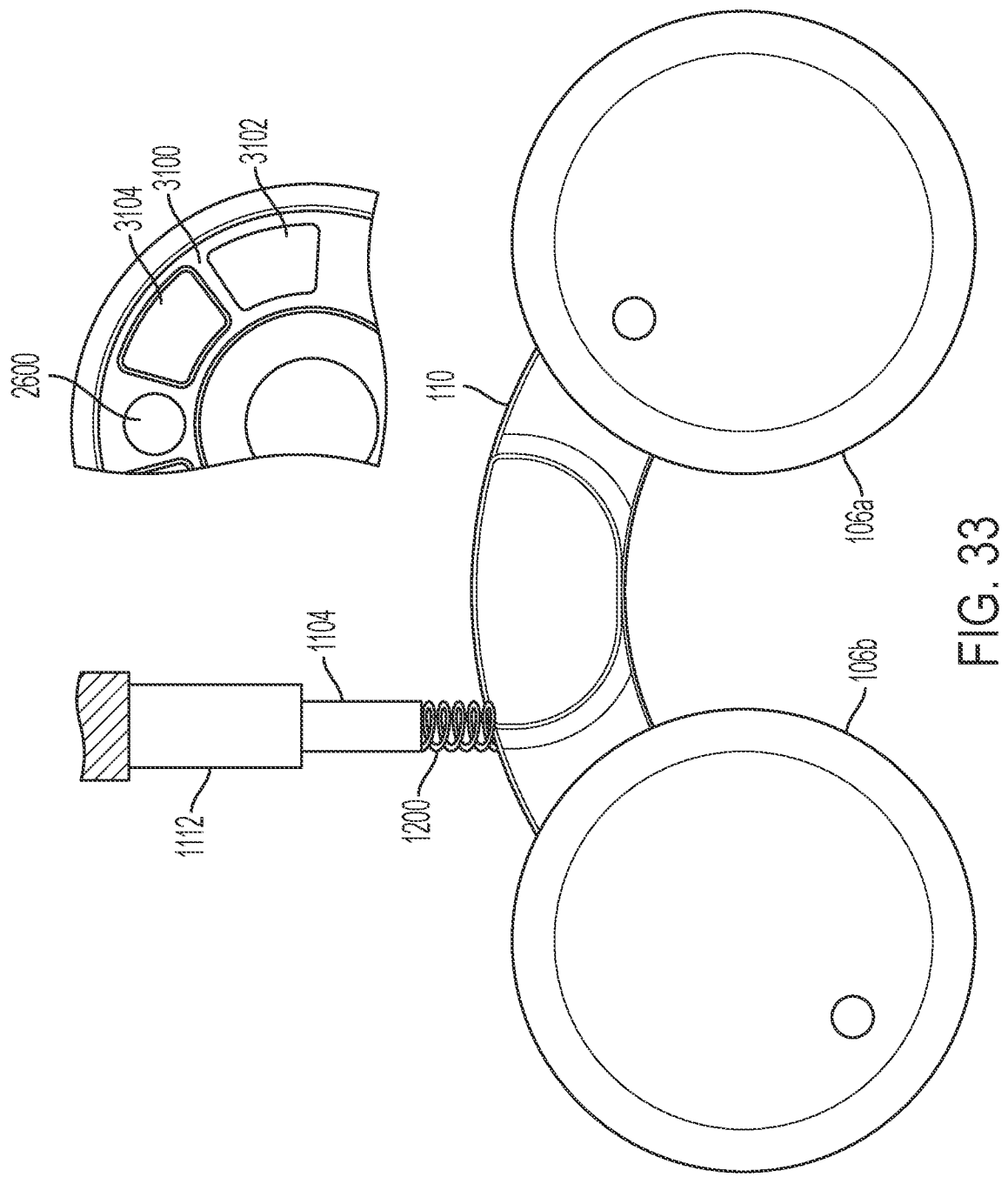
FIG. 33 is a lateral view of a continuously engaged middle primary wheel endstop and binary clutch front primary wheel endstop system, according to an embodiment of the present invention.

FIG. 33 is a lateral view of a continuously engaged middle primary wheel endstop and binary clutch front primary wheel endstop system, according to an embodiment of the present invention. The continuously engaged middle primary wheel endstop and binary clutch front primary wheel endstop system is an alternative embodiment to the linear exterior endstop system disclosed herein.

FIG. 34 is a perspective view of a dual independent worm gear actuator system, according to an embodiment of the present invention. In an alternative to the linear exterior endstop system disclosed herein, the dual independent worm gear actuator system includes dual endstop discs 3400, 3402 which are each coupled to a respective worm gears 3404, 3406. Each endstop disc 3400, 3402 includes a respective endstop 3500, 3502, which are described in more detail herein with regards to FIGS. 35A-35D. Each worm gear 3404, 3406 can be coupled to a motor (not shown), threaded rod (not shown), or gearing assembly (not shown).

In another embodiment, a spur gear (not shown) can be utilized to synchronously drive both worm gears 3404, 3406 so that the each endstop disc 3400, 3402 is rotated in an opposite direction relative to the other, thereby increasing or decreasing the range of articulation for the bogie 110.

FIG. 35A is a diagram depicting a passive state of the dual independent worm gear actuator system which provides for a large range of articulation for a bogie 110, according to an embodiment of the present invention. Each endstop disc 3400, 3402 (only endstop disc 3400 is shown in FIGS. 35A-D for illustrative purposes) includes endstops 3500, 3502, as well as a spring finger 3504. In a passive state that provides for a large articulation range, the worm gears 3404, 3406 are actuated so that the endstops 3500, 3502 are positioned on opposing sides of the endstop disc 3500, 3502 as shown in FIG. 35A, thereby allowing the spring finger 3504 to articulate +/−90° in either direction.

FIG. 35B is a diagram depicting a passive state of the dual independent worm gear actuator system which provides for a limited articulation range for the bogie 110, according to an embodiment of the present invention. In order to provide a limited articulation range for the bogie 110, the worm gears 3404, 3406 are actuated so that the endstops 3500, 3502 are positioned close to, but not in contact with, the spring finger 3504 as shown in FIG. 35B, thereby preventing a large rotation by the spring finger 3504.

FIG. 35C is a diagram depicting an active state of the dual independent worm gear actuator system where pressure is applied to the middle primary wheel 106b, according to an embodiment of the present invention. In this active state, the worm gears 3404, 3406 are actuated so that the endstop 3502 is engaged with the spring finger 3504, and the endstop 3500 is positioned as shown in FIG. 35C.

FIG. 35D is a diagram depicting an active state of the dual independent worm gear actuator system where pressure is applied to the front primary wheel 106a, according to an embodiment of the present invention. In this active state, the worm gears 3404, 3406 are actuated so that the endstop 3500 is engaged with the spring finger 3504, and the endstop 3502 is positioned as shown in FIG. 35D.

Figure 36:
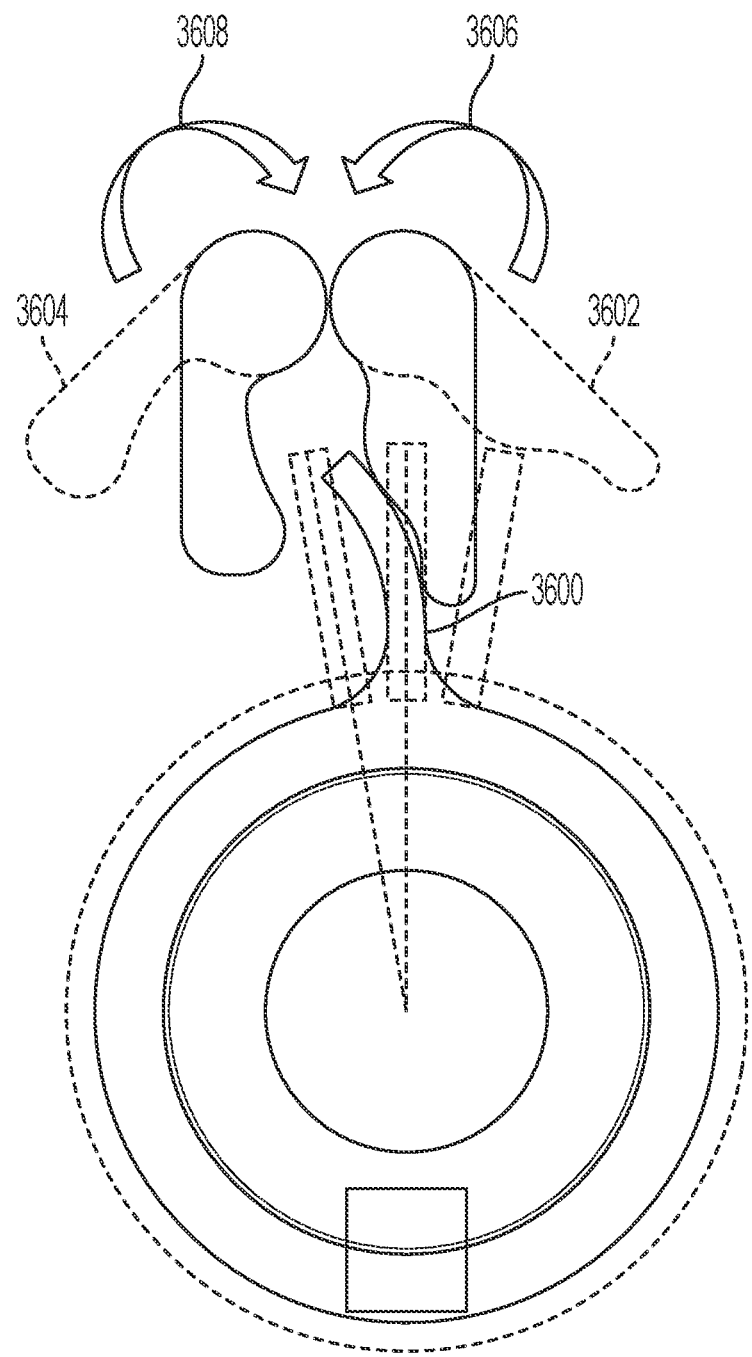
FIG. 36 is a diagram depicting a single actuator system that continuously engages a middle primary wheel endstop and a binary front primary wheel endstop, according to an embodiment of the present invention.

FIG. 36 is a diagram depicting a single actuator system that continuously engages a middle primary wheel endstop and a binary front primary wheel endstop, according to an embodiment of the present invention. In an alternative to the linear exterior endstop system disclosed herein, a spring finger 3600 can be limited in motion by endstops 3602, 3604, where at least one of the endstops 3602, 3604 can articulate in the directions indicated by respective arrows 3606, 3608 to provide an increased or decreased range of articulation for the bogie 110. In an embodiment, a spur gear (not shown) allows a single motor (not shown) to synchronously drive both endstops 3602, 3604 in opposite directions relative to the other, thereby increasing or decreasing the range of articulation for the bogie 110.

Figure 37:
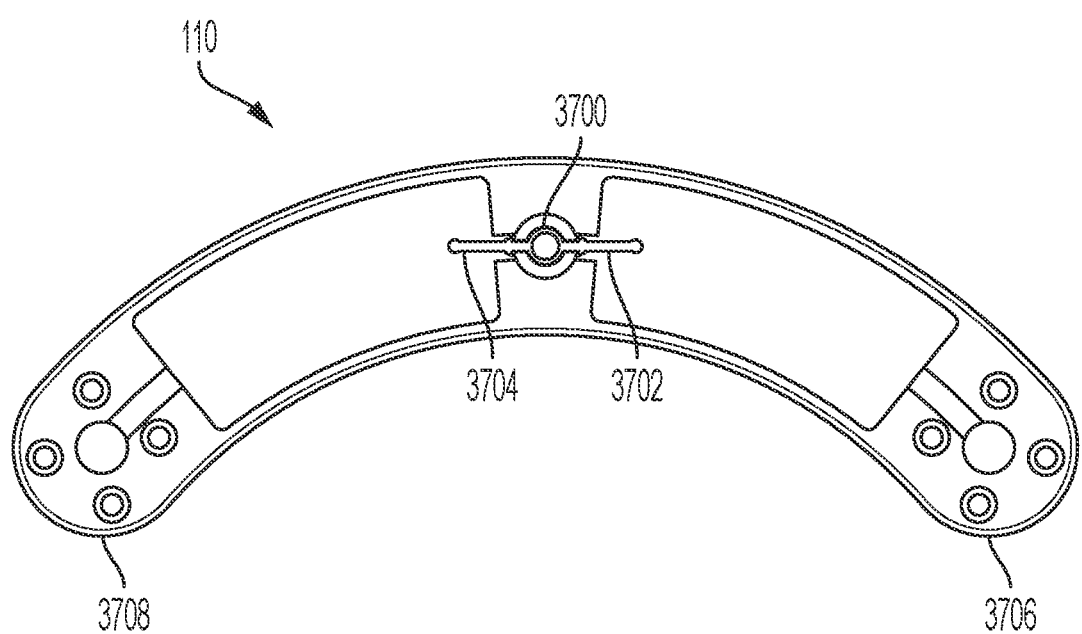
FIG. 37 is a lateral view of a bi-lateral spring finger, according to an embodiment of the present invention.

FIG. 37 is a lateral view of a bi-lateral spring finger 3700, according to an embodiment of the present invention. The bi-lateral spring finger 3700 allows for bi-directional articulation of the bogie 110. The bi-lateral spring finger 3700 includes a first profile 3702, corresponding to a mount 3706 for the front primary wheel 106a, as well as a second profile 3704 corresponding to a mount 3708 for the middle primary wheel 106b. In an embodiment, the first profile 3702 and second profile 3704 may be asymmetrical and have different actuation geometries. In another embodiment, the first profile 3702 and second profile 3074 are symmetrical to each other, and have similar or identical actuation geometries.

In an embodiment, the stiffness of the bi-lateral spring finger 3700 can be tuned to provide a limited range of articulation in either or both directions.

Figure 38A:
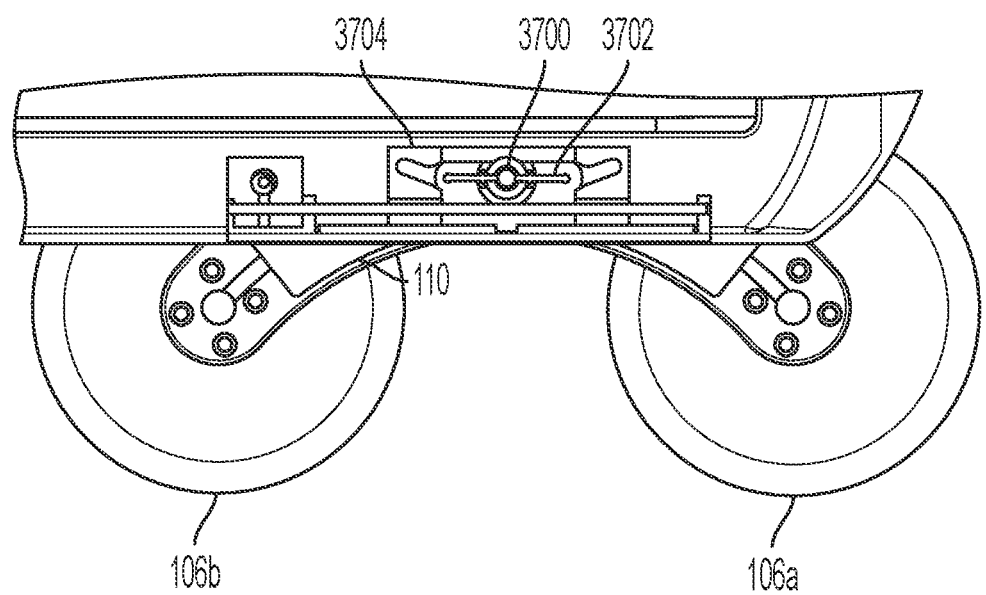
FIG. 38A is a diagram depicting a passive state of the bi-lateral spring finger, according to an embodiment of the present invention.
Figure 38B:
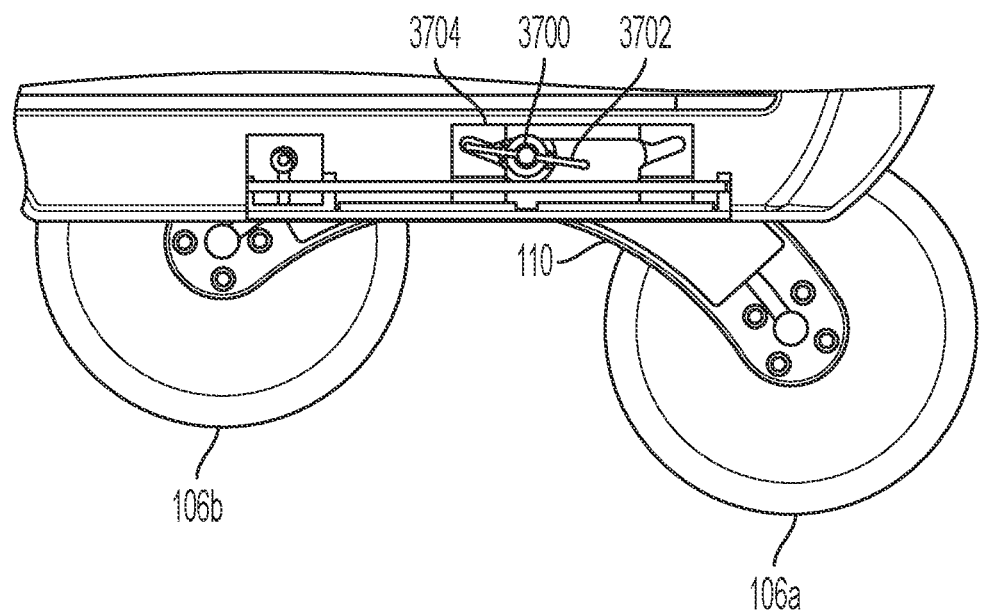
FIG. 38B is a diagram depicting a forward actuation state of the bi-lateral spring finger, according to an embodiment of the present invention.

FIG. 38A is a diagram depicting a passive state of the bi-lateral spring finger 3700, according to an embodiment of the present invention. In the passive state, the bi-lateral spring finger 3700 is in a neutral position, whereby neither the first profile 3702 or the second profile 3704 articulated, and the bi-lateral spring finger 3700 in an approximately 180° position relative to the ground plane. As shown in FIG. 38B, in the passive state, the primary wheels 106a,b are in the same plane relative to one another.

FIG. 38B is a diagram depicting a forward actuation state of the bi-lateral spring finger 3700, according to an embodiment of the present invention. In the forward actuation state, the first profile 3702 is rotated toward the ground plane, thereby articulating the bogie 110 so that downward pressure is applied to the front primary wheel 106a.

Figure 38C:
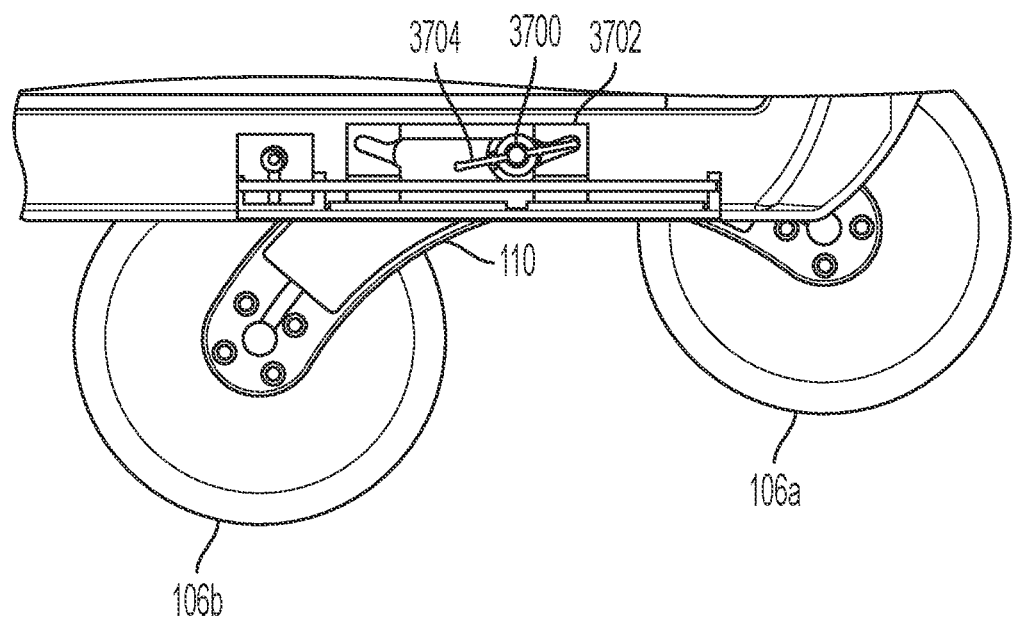
FIG. 38C is a diagram depicting a rear actuation state of the bi-lateral spring finger, according to an embodiment of the present invention.

FIG. 38C is a diagram depicting a rear actuation state of the bi-lateral spring finger 3700, according to an embodiment of the present invention. In the rear actuation state, the second profile 3704 is rotated toward the ground plane, thereby articulating the bogie 110 so that downward pressure is applied to the middle primary wheel 106b.

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention is not limited to the particular embodiments disclosed for carrying out the invention.

What is claimed is:

1. A system to actuate wheels on a vehicle, comprising:
    a bogie having a first end and a second end, the bogie rotatable about a pivot location between the first end and the second end;
    a first wheel mounted to the first end of the bogie;
    a second wheel mounted to the second end of the bogie;
    a first linear actuator coupled to a first endstop, the first linear actuator capable of deploying and retracting the first endstop, the first endstop configured to apply pressure to the bogie at a first location when deployed by the first linear actuator;
    a second linear actuator coupled to a second endstop, the second linear actuator capable of deploying and retracting the second endstop, the second endstop configured to apply pressure to the bogie at a second location when deployed by the second linear actuator, and
    a locking mechanism configured to hold the first endstop or the second endstop in a deployed position,
    wherein the first endstop and the second endstop are independently deployed and retracted,
    wherein the first end is prevented from moving in an upward direction when the first endstop is deployed, and
    wherein the second end is prevented from moving in an upward direction when the second endstop is deployed.

2. The system of claim 1, wherein the bogie is capable of rotating +/−90° when neither the first endstop and the second endstop are deployed.

3. The system of claim 1, wherein at least one of the first endstop and the second endstop includes a compliant member that is configured to engage the bogie.

4. The system of claim 1, wherein the locking mechanism is configured to relieve the first linear actuator or the second linear actuator from applying pressure to the bogie.

5. The system of claim 1, further comprising a force sensor coupled to at least one of the first endstop and the second endstop.

6. The system of claim 1, further comprising a first housing configured to receive the first endstop when the first endstop is retracted.

7. The system of claim 1, further comprising a second housing configured to receive the second endstop when the second endstop is retracted.

8. A system to actuate wheels on a vehicle, comprising:
    a bogie having a first end and a second end, the bogie rotatable about a pivot location between the first end and the second end;
    a first wheel mounted to the first end of the bogie;
    a second wheel mounted to the second end of the bogie;
    a first linear actuator coupled to a first endstop, the first endstop configured to apply pressure to the bogie at a first location when deployed by the first linear actuator;
    a second linear actuator coupled to a second endstop, the second endstop configured to apply pressure to the bogie at a second location when deployed by the second linear actuator, and
    a locking mechanism configured to hold the first endstop or the second endstop in a deployed position,
    wherein the first linear actuator is configured to partially retract the first endstop and fully retract the first endstop, and
    wherein the second linear actuator is configured to partially retract the second endstop and fully retract the second endstop.

9. The system of claim 8, wherein when the first endstop is partially retracted, the first end of the bogie is capable of rotating +/−30°.

10. The system of claim 8, wherein when the second endstop is partially retracted, the second end of the bogie is capable of rotating +/−30°.

11. The system of claim 8, wherein when the first endstop is fully retracted, the first end of the bogie is capable of rotating +/−5°.

12. The system of claim 8, wherein when the second endstop is partially retracted, the second end of the bogie is capable of rotating +/−5°.

13. The system of claim 8, wherein the first endstop and the second endstop are independently and selectively deployed.

14. A system to actuate wheels on a vehicle, comprising:
a bogie having a first end and a second end, the bogie rotatable about a pivot location between the first end and the second end;
a first wheel mounted to the first end of the bogie;
a second wheel mounted to the second end of the bogie;
a first linear actuator coupled to a first endstop, the first linear actuator capable of deploying and retracting the first endstop, the first endstop configured to apply pressure to the bogie at a first location when deployed by the first linear actuator;
a second linear actuator coupled to a second endstop, the second linear actuator capable of deploying and retracting the second endstop, the second endstop configured to apply pressure to the bogie at a second location when deployed by the second linear actuator, and
a locking mechanism configured to hold the first endstop or the second endstop in a deployed position, wherein the first linear actuator and second linear actuator are configured to independently operate.

15. The system of claim 14, wherein the bogie is capable of rotating +/−90° when neither the first endstop and the second endstop are deployed.

16. The system of claim 14, wherein at least one of the first endstop and the second endstop includes a compliant member that is configured to engage the bogie.

17. The system of claim 14, wherein the locking mechanism is configured to relieve the first linear actuator or the second linear actuator from applying pressure to the bogie.

18. The system of claim 14, further comprising a force sensor coupled to at least one of the first endstop and the second endstop.

19. The system of claim 14, further comprising a first housing configured to receive the first endstop when the first endstop is retracted.

20. The system of claim 14, further comprising a second housing configured to receive the second endstop when the second endstop is retracted.

* * * * *